(12) United States Patent
Chang et al.

(10) Patent No.: US 10,484,463 B2
(45) Date of Patent: *Nov. 19, 2019

(54) LOAD BALANCING SYSTEM, LOAD BALANCING DEVICE AND TOPOLOGY MANAGEMENT METHOD

(71) Applicant: Industrial Technology Research Institute, Hsinchu (TW)

(72) Inventors: Shu-Hsin Chang, Tainan (TW); Kun-Hsien Lu, Kaohsiung (TW); Yu-Hsien Hsiao, Chiayi County (TW); Ching-Chun Kao, New Taipei (TW); Yi-Yu Su, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 209 days.

This patent is subject to a terminal disclaimer.

(21) Appl. No.: 15/470,924

(22) Filed: Mar. 28, 2017

(65) Prior Publication Data

US 2017/0279881 A1    Sep. 28, 2017

(30) Foreign Application Priority Data

Mar. 28, 2016 (TW) ............................. 105109609 A
Dec. 21, 2016 (TW) ............................. 105142409 A

(51) Int. Cl.
*H04L 12/00* (2006.01)
*H04L 29/08* (2006.01)
(Continued)

(52) U.S. Cl.
CPC .......... *H04L 67/1004* (2013.01); *H04L 41/12* (2013.01); *H04L 65/4084* (2013.01); *H04L 65/601* (2013.01); *H04L 67/1008* (2013.01)

(58) Field of Classification Search
CPC ... H04L 67/1002; H04L 47/125; H04L 65/60; H04L 12/1827; H04L 65/4069
(Continued)

(56) References Cited

U.S. PATENT DOCUMENTS 6,976,090 B2 * 12/2005 Ben-Shaul ........ H04L 29/12066
709/246
7,032,037 B2 * 4/2006 Garnett .................. G06F 1/183
709/223

(Continued)

FOREIGN PATENT DOCUMENTS

CN       1604551      4/2005
CN     101080001     11/2007
(Continued)

OTHER PUBLICATIONS

Zhuo Chen et al., "Load transfer based bandwidth allocation Policy for Peer-to-Peer Streaming Applications", Journal of Computational Information Systems, Feb. 2013, 1575~1582.
(Continued)

*Primary Examiner* — Frantz Coby
(74) *Attorney, Agent, or Firm* — JCIPRNET

(57) ABSTRACT

The disclosure provides a load balancing system, a load balancing device and a topology management method. The topology management method includes configuring and maintaining a transmission progress value for each of edge servers; grouping the edge servers into server groups, wherein the edge servers of each of the server groups provide one of a plurality of video streams, and each of the edge servers is grouped into at least one server group among the server groups; selecting a first video stream from at least one video stream corresponding of a first edge server having bandwidth usage rate higher than a high load threshold; synchronizing video data of the first video stream to a second edge server; setting a transmission progress value of
(Continued)

the second edge server as a transmission progress value of the first edge server; and adding the second edge server into the server group corresponding to the first video stream.

24 Claims, 16 Drawing Sheets

(51) Int. Cl.
*H04L 29/06* (2006.01)
*H04L 12/24* (2006.01)

(58) Field of Classification Search
USPC .............................. 709/223, 224, 226, 231
See application file for complete search history.

(56) References Cited

U.S. PATENT DOCUMENTS

| | | | |
|---|---|---|---|
| 7,088,718 B1* | 8/2006 | Srivastava | H04L 45/00 370/392 |
| 7,155,723 B2* | 12/2006 | Swildens | H04L 29/12066 718/105 |
| 7,346,676 B1* | 3/2008 | Swildens | H04L 67/1008 709/223 |
| 7,490,164 B2* | 2/2009 | Srivastava | H04L 45/50 370/235 |
| 7,512,702 B1* | 3/2009 | Srivastava | H04L 45/00 370/236 |
| 7,784,055 B2* | 8/2010 | Srivastava | H04L 29/12066 370/229 |
| 8,161,159 B1* | 4/2012 | Shetty | H04L 12/1827 709/226 |
| 8,244,874 B1 | 8/2012 | Thireault | |
| 8,819,187 B1 | 8/2014 | Hofmann | |
| 8,862,775 B2 | 10/2014 | Chiueh et al. | |
| 8,892,686 B1 | 11/2014 | Thibeault et al. | |
| 9,088,577 B2* | 7/2015 | Zhu | H04L 67/1002 |
| 2003/0172163 A1 | 9/2003 | Fujita et al. | |
| 2004/0049579 A1 | 3/2004 | Ims et al. | |
| 2006/0045132 A1 | 3/2006 | Metke | |
| 2006/0129665 A1 | 6/2006 | Toebes et al. | |
| 2008/0114866 A1 | 5/2008 | Round | |
| 2010/0064008 A1 | 3/2010 | Yan et al. | |
| 2010/0333150 A1 | 12/2010 | Broerman et al. | |
| 2012/0131178 A1* | 5/2012 | Zhu | H04L 67/1002 709/224 |
| 2012/0303818 A1 | 11/2012 | Thibeault et al. | |
| 2014/0101306 A1 | 4/2014 | Murgia | |
| 2015/0081847 A1 | 3/2015 | Hao et al. | |
| 2015/0113157 A1* | 4/2015 | Chan | H04L 65/60 709/231 |
| 2015/0117216 A1* | 4/2015 | Anand | H04L 47/125 370/236 |
| 2015/0127774 A1 | 5/2015 | Hitomi et al. | |

FOREIGN PATENT DOCUMENTS

| | | | | |
|---|---|---|---|---|
| CN | 101262488 | 9/2008 | | |
| CN | 101282281 | 10/2008 | | |
| CN | 101312464 | 11/2008 | | |
| CN | 103778591 | 5/2014 | | |
| TW | 201408005 | 2/2014 | | |
| WO | WO-2011090715 A2 * | 7/2011 | ......... | H04N 21/2225 |

OTHER PUBLICATIONS

Yinqing Zhao et al., "Dynamic load balancing and content update for media storage servers", Proceedings of SPIE—The International Society for Optical Engineering, vol. 4736, Jul. 2002, 201~212.

João Paulo Ponciano et al., "Load Balancing in Modern Network Infrastructures—a Simulation Model", International Symposium on Communication Systems, Networks and Digital Signal Processing, Jul. 2014, 841~846.

Yang Li-Hui et al., The abstract of "A Variable Weighted Least-Connection Algorithm for Multimedia Transmission", Journal of Shanghai University (English Edition), vol. 7, No. 3, Jan. 2003, 1~4.

Junyeop Kim et al., "Dynamic load balancing for efficient video streaming service", International Conference on Information Networking, Jan. 2015, 216~221.

Weikun Wang et al., "Evaluating weighted round robin load balancing for cloud web services", International Symposium on Symbolic and Numeric Algorithms for Scientific Computing, Sep. 2014, 393~400.

"Office Action of Taiwan Counterpart Application," dated Jan. 10, 2018, p. 1-p. 3, in which the listed references were cited.

"Office Action of China Counterpart Application", dated Jun. 5, 2019, pp. 1-6.

* cited by examiner

LOAD BALANCING SYSTEM, LOAD BALANCING DEVICE AND TOPOLOGY MANAGEMENT METHOD

CROSS-REFERENCE TO RELATED APPLICATION

This application claims the priority benefit of Taiwan application serial no. 105109609, filed on Mar. 28, 2016, and Taiwan application serial no. 105142409, filed on Dec. 21, 2016. The entirety of each of the above-mentioned patent application is hereby incorporated by reference herein and made a part of this specification.

TECHNICAL FIELD

The disclosure relates to a load balancing system, a load balancing device and a topology management method and also relates to a load balancing system, a load balancing device and a topology management method capable of optimizing the use of bandwidths and hardware resources.

BACKGROUND

With rapid development of Internet technology and cloud computing technology, a business may rapidly employ virtual machines for providing various application services, such as web file transmission, video on demand and live streaming, by using a cloud environment as cloud computing services have advantages of high reliability, low construction cost and preferable expandability, so to solve problems with respect to poor utilization and equipment maintenance cost caused by self-constructed system equipment in the related art. Although the cloud computing services bring benefits; however, for the business, to effectively adjust a service scale of a cloud system according to the user number to maintain preferable service quality is an important issue.

Taking the live streaming application service for example, after a video publishing end uploads a live stream to a streaming origin server designated by a video service system, the streaming origin server spreads streaming data to streaming edge servers for users to connect for live playback. Such structure is a typical and widely used origin-edge structure. In this structure, the video service system configures a load balancer to receive a view request for a live stream and deliver the stream data on separated connections, which refers that a user, when desiring to view a specific video channel, has to first connect to the load balancer and then, decides which streaming edge server the user connection is redirected to, thereby, obtaining live streaming data of the video channel. Each video channel may generate a plurality of live streams corresponding to a variety of resolutions. Additionally, different video channels have different numbers of online viewers varying with popularities and playback times of their video contents. If the streaming edge servers configured for serving the user by the video streaming system are insufficient, connection congestion may easily occur in a condition that the viewers are in a large number, which results in declined service quality experienced by the user due to unsmoothness of the video playback and increase of delay time. On the contrary, if the streaming edge servers are configured in a large number, in the case of a low number of viewer, would leads to the waste in cloud resources and increase in host rental costs.

Many load balancing methods of network traffic are provided and applied at present, for example, a random load balancing method, round robin (RR) load balancing method, a weighted round robin (WRR) load balancing method, a weighted fair queuing (WFQ) load balancing method, a least connection load balancing method, a weighted least connection load balancing method, a server load estimation load balancing method and so on. In various video application scenarios with multiple video streams and dynamic viewer numbers, how to apply an adaptive load balancing method with the use of dynamic server scaling/reduction mechanisms to achieve effectively spreading video data and saving the host rental cost becomes a challenge.

SUMMARY

The disclosure relates a load balancing system, a load balancing device and a topology management method, which renders a self-adapted resource usage amount transferring among corresponding server groups for video data transmission, so as to achieve a load balancing effect by the least number of bandwidths and optimization of hardware resource utilization.

An exemplary embodiment of the disclosure provides a topology management method. The topology management method includes configuring a transmission progress value for each of a plurality of edge servers, and grouping the edge servers into a plurality of server groups. The edge servers of each of the server groups provide one of a plurality of video streams, and each of the edge servers is grouped into at least one server group among the server groups. The topology management method also includes selecting a first edge server from the plurality of edge servers. A bandwidth usage rate of the first edge server is more than a high load threshold, and the first edge server provides video data of at least one video stream of the plurality of video streams. The topology management method still includes selecting a first video stream from the at least one video stream corresponding of the first edge server, and selecting a second edge server from the plurality of edge servers. The topology management method further includes synchronizing video data of the first video stream to the second edge server, setting a transmission progress value of the second edge server as a transmission progress value of the first edge server, and adding the second edge server into the server group corresponding to the first video stream.

An exemplary embodiment of the disclosure provides a load balancing system including a plurality of edge servers, a plurality of origin servers and a load balancing device. The origin servers are coupled to the edge servers. Each of the origin servers generates one of a plurality of video streams, and video data of the video stream is synchronized to at least one of the edge servers. The load balancing device configures and maintains a transmission progress value for each of the edge servers. The load balancing device groups the edge servers into a plurality of server groups, wherein the edge servers of each of the server groups provide the video stream, and each of the edge servers is grouped into at least one server group among the server groups. The load balancing device selects a first edge server from the plurality of edge servers, wherein a bandwidth usage rate of the first edge server is more than a high load threshold, and the first edge server provides video data of at least one video stream of the plurality of video streams. The load balancing device selects a first video stream from the at least one video stream corresponding of the first edge server, and selects a second edge server from the plurality of edge servers. The load balancing device synchronizes video data of the first video stream to the second edge server. The load balancing device sets a transmission progress value of the second edge server as a transmission progress value of the first edge server, and adds the second edge server into the server group corresponding to the first video stream.

An exemplary embodiment of the disclosure provides a load balancing device including a processing unit and a communication unit. The load balancing device is coupled to a plurality of origin servers and a plurality of edge servers through the communication unit, and the origin servers are coupled to the edge servers. Each of the origin servers generates one of a plurality of video streams, and video data of the video stream is synchronized to at least one of the edge servers. The processing unit configures and maintains a transmission progress value for each of the edge servers. The processing unit groups the edge servers into a plurality of server groups. The edge servers of each of the server groups provide the video stream, and each of the edge servers is grouped into at least one server group among the server groups. The processing unit selects a first edge server from the plurality of edge servers, wherein a bandwidth usage rate of the first edge server is more than a high load threshold, and the first edge server provides video data of at least one video stream of the plurality of video streams. The processing unit selects a first video stream from the at least one video stream corresponding of the first edge server, and selects a second edge server from the plurality of edge servers. The processing unit sends a message to the origin server corresponding to the first video stream or the second edge server, and synchronizes video data of the first video stream to the second edge server. The processing unit sets a transmission progress value of the second edge server as a transmission progress value of the first edge server, and adds the second edge server into the server group corresponding to the first video stream.

To sum up, in the topology management method introduced by the disclosure, each of the edge servers is configured and maintained a transmission progress value, and a server with the less load among all the servers in the server group is selected to provide the video data. In the topology management method provided by the disclosure, when a high-load edge server within the system, then the video streams redirect to the other edge servers which have less load, and maintains the load balancing of bandwidths and hardware resources of all edge servers of the system.

Several exemplary embodiments accompanied with figures are described in detail below to further describe the disclosure in details.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
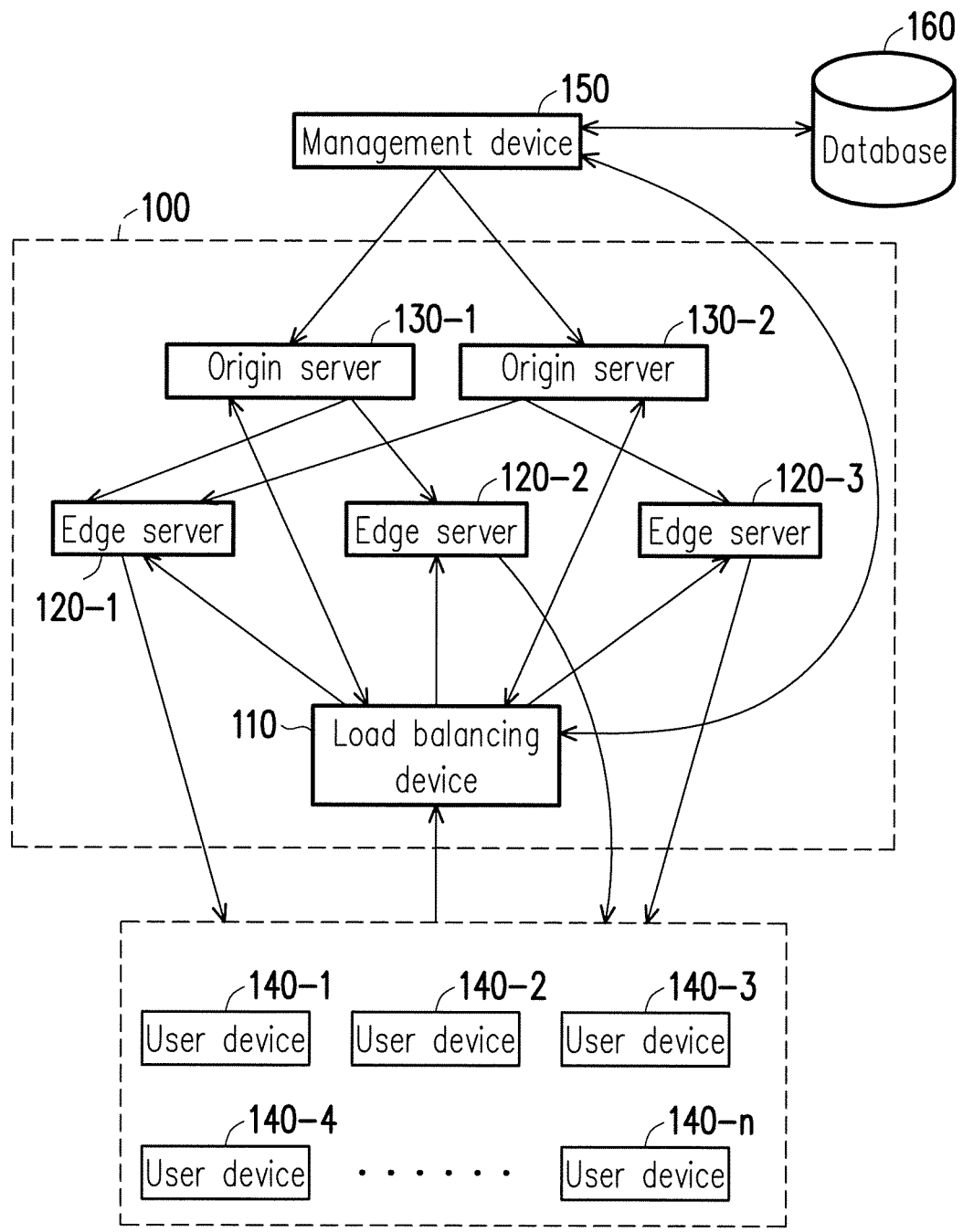
FIG. 1 is a block diagram of a load balancing system according to an exemplary embodiment.

FIG. 1 is a block diagram of a load balancing system according to an exemplary embodiment.

Referring to FIG. 1, a load balancing system 100 includes a load balancing device 110, edge servers 120-1 to 120-3 and origin servers 130-1 to 130-2. It should be noted first that even though only three edge servers 120-1 to 120-3 and two origin servers 130-1 to 130-2 are illustrated in FIG. 1, the disclosure is not limited thereto, and the load balancing system 100 may include any numbers of edge servers and origin servers. The number and objects of the edge servers 120-1 to 120-3 that the origin servers 130-1 to 130-2 are coupled to are dynamically adjusted according to a load balancing state of the load balancing system 100. The load balancing system 100 may be coupled to a plurality of user devices 140-1 to 140-$n$ and a management device 150, where the management device 150 may also be coupled to a database 160. The user devices 140-1 to 140-$n$ may be electronic devices, such as personal computers (PCs), notebook computers (NBs), tablet computers and smart phones. A user may download video data from the edge servers 120-1 to 120-3 by using software on one of the user devices 140-1 to 140-$n$, such as a web browser or a player. In an exemplary embodiment, the load balancing device 110 may be a server including a processor (which is also referred to as a processing unit) and a communication chip (which is also referred to as a communication unit).

Each of the edge servers 120-1 to 120-3 and each of the origin servers 130-1 to 130-2 may be equipped in the same machine or different machines. Each of the origin servers 130-1 to 130-2 may be disposed together with any one of the edge servers 120-1 to 120-3 in the same physical machine or the same virtual machine. When the origin servers 130-1 to 130-2 and the edge servers 120-1 to 120-3 are equipped in the same physical or virtual machine, the origin servers 130-1 to 130-2 and the edge servers 120-1 to 120-3 share a network bandwidth resource and a computing resource of a central processing unit (CPU) of the same physical or virtual machine. The load balancing device 110 may be located together with any one of the edge servers 120-1 to 120-3 or any one of the origin servers 130-1 to 130-2 in the same physical or virtual machine or different physical or virtual machines. The load balancing device 110 may be a program code implemented by software or a load balancing circuit implemented by hardware, or may be a solely disposed load balancing server.

For example, when a video publishing end uses a video publishing software or device to upload video data of a video stream to the origin server 130-1, the load balancing device 110 instructs the origin server 130-1 to synchronize video data to a server group consisting of the edge servers 120-1 and 120-2 according to a total traffic amount required by the video stream, such that the user devices 140-1 to 140-$n$ download video data from the edge server 120-1 or 120-2 of the server group. Specifically, the load balancing device 110 may adjust the server group corresponding to the video stream according to a load condition of each edge server and dynamically expand or reduce the number of the edge servers in the server group.

When the user devices 140-1 to 140-$n$ are about to download video data, the user devices 140-1 to 140-$n$ send requests to inquiry for uniform resource locators (URLs) of the edge servers from the load balancing device 110, and send requests to the edge servers after obtaining the URLs of the edge servers, so as to download video data. The aforementioned downloading process may use the Hyper-Text Transfer Protocol (HTTP) URL direction to be compatible with video data downloading of the currently available players. When the load balancing device 110 receives the download requests from the user devices 140-1 to 140-$n$, the load balancing device 110 selects one of the edge servers (e.g., the edge server 120-1) according to the load conditions of the edge servers of the server group (e.g., the server group consisting of the edge servers 120-1 and 120-2) corresponding to a video stream (e.g., the video stream of the origin server 130-1) to be downloaded by the user devices 140-1 to 140-$n$ and replies a URL of the selected edge server to the user devices 140-1 to 140-$n$.

Namely, the origin server 130-1 encodes video data and spreads video data to the edge servers 120-1 and 120-2. The edge servers 120-1 and 120-2 receives the encoded video data and provide download bandwidths for the user devices 140-1 to 140-$n$ to download video data. The load balancing device 110 determines a spreading topology of video data. The spreading topology refers to a connectivity status with respect to video data of video streams synchronized from the origin servers 130-1 to 130-2 to the edge servers 120-1 to 120-3 when the origin servers 130-1 to 130-2 synchronize video data to the edge servers 120-1 to 120-3. The load balancing device 110 also determines a transmission schedule of video data and provides a redirecting URL for downloading video data, such that the user devices 140-1 to 140-$n$ may download video data from the correct edge servers.

Additionally, the management device 150, when a video stream is published, selects an origin server (e.g., the origin server 130-1) corresponding to the video stream and records the aforementioned data in the database 160. The management device 150 may also perform configuration setting on the load balancing device 110 and provide the video stream and server information, or look up history data with respect to the load balancing system 100 in the database 160.

Figure 2:
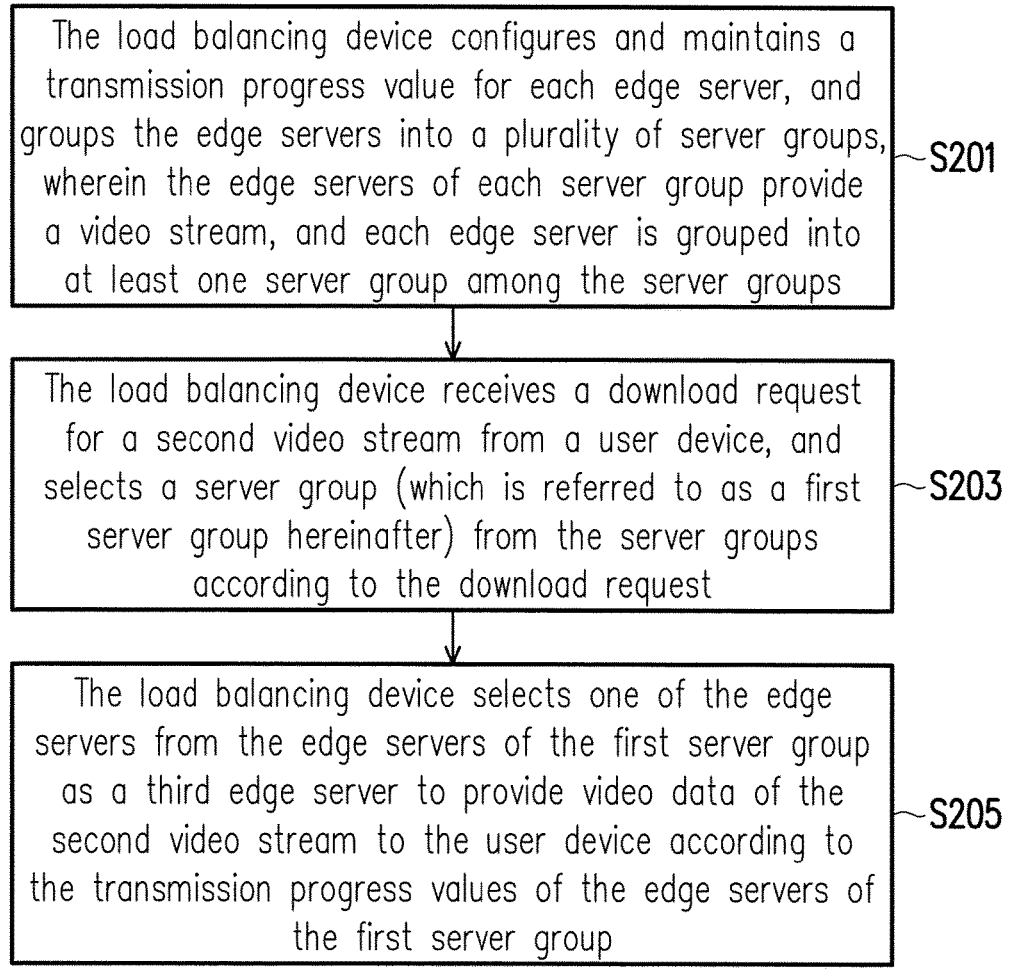
FIG. 2 is a flowchart of a load balancing method according to an exemplary embodiment.

FIG. 2 is a flowchart of a load balancing method according to an exemplary embodiment.

Referring to FIG. 2, in step S201, the load balancing device 110 configures and maintains a transmission progress value for each edge server, and groups the edge servers into a plurality of server groups. In this case, the edge servers of each server group are configured to provide a video stream, and each edge server is grouped into at least one server group among the server groups. In step S203, the load balancing device 110 receives a download request for a second video stream from a user device, and selects a server group (which is referred to as a first server group hereinafter) from the server groups according to the download request. The first server group provides the second video stream corresponding to the download request. In step S205, the load balancing device 110 selects one of the edge servers from the edge servers of the first server group as a third edge server to provide video data of the second video stream to the user device according to the transmission progress values of the edge servers of the first server group. It should be noted that besides selecting one of the edge servers of the first server group having the minimum transmission progress value as the third edge server, the load balancing device 110 also calculates an increment and accumulates the increment to the transmission progress value of the third edge server, and redirects the download request to the third edge server. In the present exemplary embodiment, the increment is calculated by dividing the size of video data by a first bandwidth parameter of the third edge server.

The bandwidth parameter corresponding to the edge server is determined according to an outbound bandwidth of the edge server. A bandwidth parameter ratio and an outbound bandwidth ratio of any two of the edge servers are equal. For example, an outbound bandwidth of an edge server 1 is 100 Mbps, an outbound bandwidth of an edge server 2 is 200 Mbps, and then, bandwidth parameters of the edge server 1 and edge server 2 may be respectively 100 and 200, $100\times10^6$ and $200\times10^6$, or $100/(100+200)$ and $200/(100+200)$, i.e., $\frac{1}{3}$ and $\frac{2}{3}$ and so on.

Additionally, the bandwidth parameter ratio of any two of the edge servers may be set to be equal to a reserved outbound bandwidth ratio. For example, a reserved outbound bandwidth of the edge server 1 is 80 Mbps, a reserved outbound bandwidth of the edge server 2 is 180 Mbps, and then, the bandwidth parameters of the edge server 1 and edge server 2 may be respectively 80 and 180, $80\times10^6$ and $180\times10^6$, or $80/(80+180)$ and $180/(80+180)$, i.e., $\frac{4}{13}$ and $\frac{9}{13}$ and so on.

Figure 3:
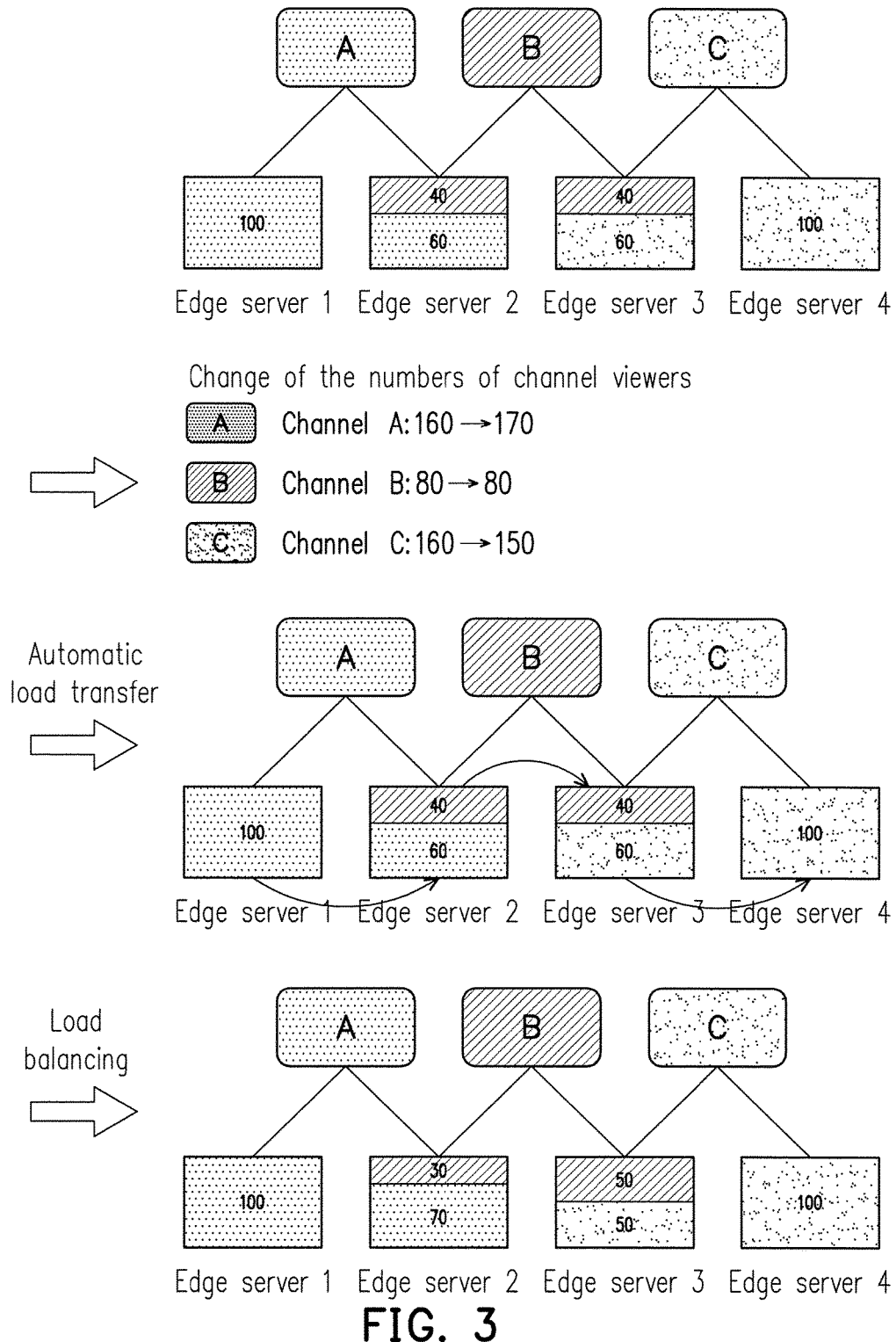
FIG. 3 illustrates an example of the load balancing method according to an exemplary embodiment.

FIG. 3 illustrates an example of the load balancing method according to an exemplary embodiment.

Referring to FIG. 3, three video channels are provided in the present example, i.e., channels A, B and C, which respectively correspond to video streams generated by origin servers A, B and C, and provide outbound bandwidths by using the edge servers 1, 2, 3 and 4 (it is assumed in the present exemplary embodiment that the channels correspond to the origin servers one to one, and thus, the same reference symbols A, B and C are used to represent the video channels and the origin servers simultaneously). A video stream of the channel A is synchronized to the edge servers 1 and 2, a video stream of the channel B is synchronized to the edge servers 2 and 3, and a video stream of the channel C is synchronized to the edge servers 3 and 4. A load-sharing service provided to each channel by the edge servers is presented by means of filling blocks, and a bandwidth usage amount thereof is presented by an area of the filled block. Accordingly, the edge server 1 serves the channel A, the edge server 2 serves both the channels A and B, the edge server 3 serves both the channels B and C, and the edge server 4 serves the channel C. Additionally, for simplicity of description, it is assumed hereinafter that the outbound bandwidth of each edge server is simultaneously available for all of 100 user devices to download video stream data from the channels.

As the number of viewers watching each channels changes (for example, the number of the viewers watching the channel A is increased from 160 to 170, the number of the viewers watching the channel B maintains 80, and the number of the viewers watching the channel C is decreased from 160 to 150), in the load balancing method of the present exemplary embodiment, the bandwidths provided by the edge servers 1, 2, 3 and 4 to each channel may be instantly adapted, and a bandwidth load of the video stream of each channel at each edge server is automatically adjusted and converged to achieve an adaptive bandwidth load balancing state. For example, bandwidths provided by the edge server 2 to the channels A and B are adjusted from 60 and 40 to 70 and 30, and bandwidths provided by the edge server 3 to the channels B and C are adjusted from 40 and 60 to 50 and 50.

The aforementioned relation that each video channel corresponds to one of the origin servers, and the origin server generates a video stream corresponding to each video channel is set forth only for descriptive convenience. Actually, each origin server may be simultaneously coupled to and serve a plurality of video channels, and the origin servers may generate a plurality of video streams corresponding to a variety of resolutions for each video channel. For the edge servers, a plurality of video streams corresponding to the same video channel are considered as different video streams. Thus, it is more accurate to say that the object which each edge server provides the load-sharing service to is an individual video stream. Namely, video data of a plurality of video streams corresponding to the same video channel may be synchronized to different edge servers.

Figure 4:
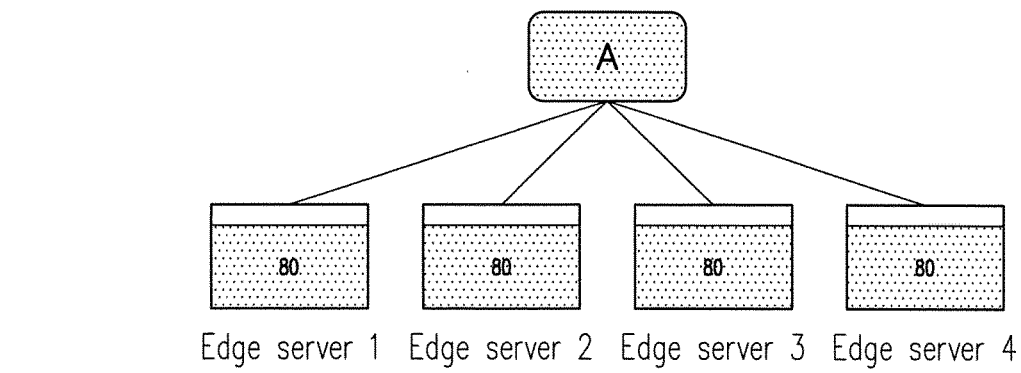
FIG. 4 illustrates another example of the load balancing method according to an exemplary embodiment.
Figure 4:
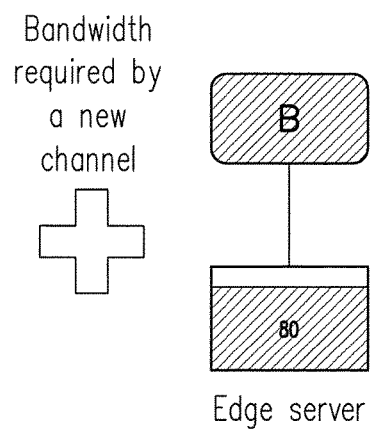
Figure 4:
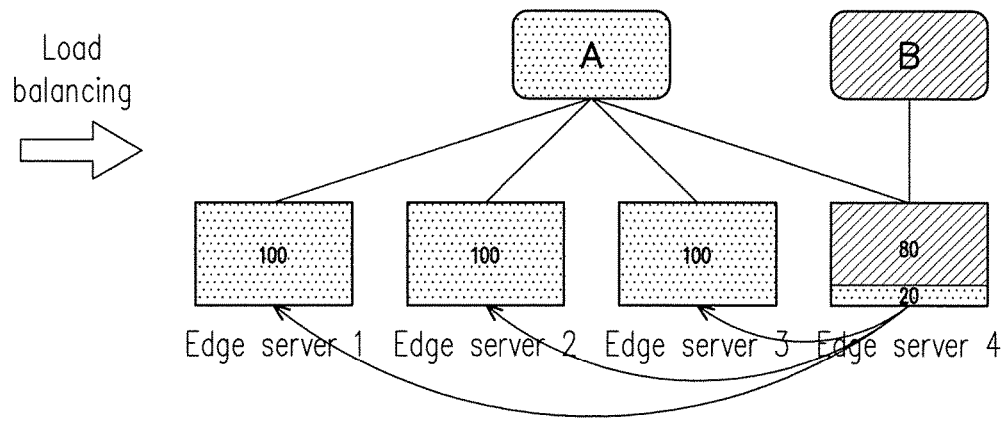

FIG. 4 illustrates another example of the load balancing method according to an exemplary embodiment.

Referring to FIG. 4, the video stream of the channel A is synchronized to the edge servers 1, 2, 3 and 4, the bandwidth usage amount of each edge server is 80, and the remaining bandwidth thereof is 20. It is assumed the channel B shares the bandwidth of the edge server 4, and as the number of viewers watching the channel B is increased to 80, in the load balancing method of the present exemplary embodiment, the bandwidth usage amount of the video stream of the channel A originally at the edge server 4 is automatically transferred to the edge servers 1, 2 and 3, such that the bandwidths required by the video streams of the channels A and B may be satisfied.

According to the examples illustrated in FIG. 3 and FIG. 4, when the bandwidth required by each video channel varies with the number of viewers, the load balancing method of the present exemplary embodiment may be utilized to automatically adjust a bandwidth distribution ratio of all the edge servers.

Figure 5A:
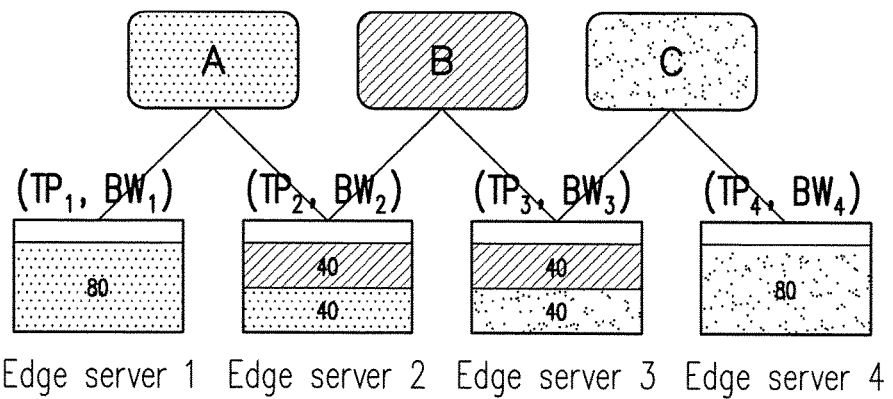
FIG. 5A and FIG. 5B illustrate an example for describing a principle of operation of the load balancing method according to an exemplary embodiment.
Figure 5A:
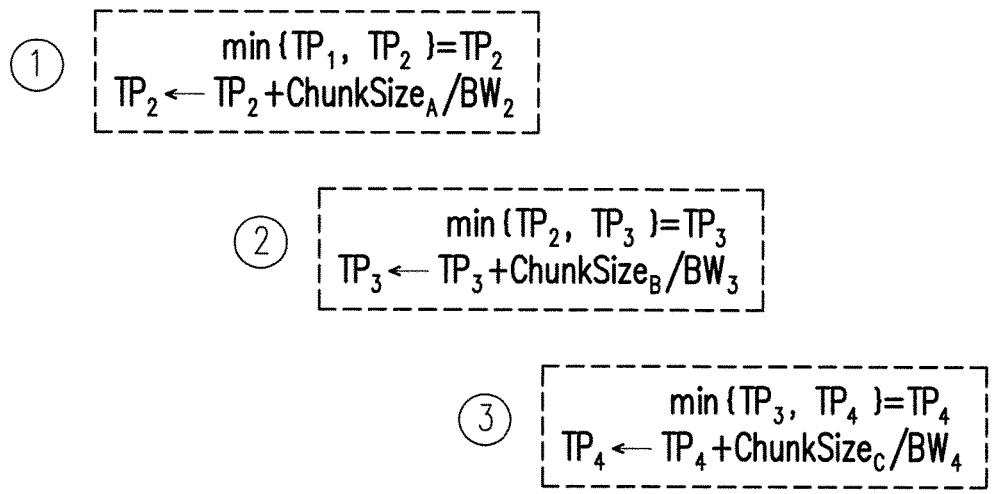
Figure 5B:
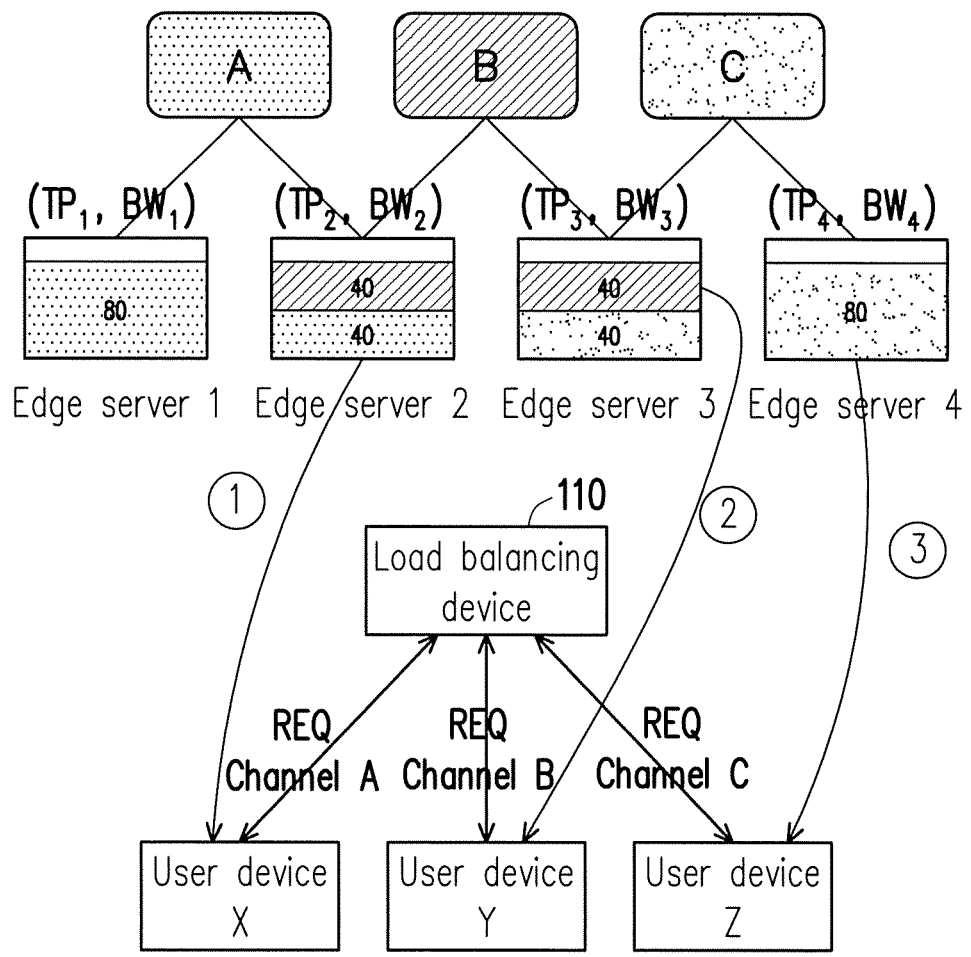

FIG. 5A and FIG. 5B illustrate an example for describing a principle of operation of the load balancing method according to an exemplary embodiment.

Referring to FIG. 5A, three video channels are provided in the present example. The video stream of the channel A is synchronized to the edge servers 1 and 2, the video stream of the channel B is synchronized to the edge servers 2 and 3, and the video stream of the channel C is synchronized to the edge servers 3 and 4. The load balancing device 110 configures a transmission progress value corresponding to each edge server. The transmission progress value are respectively $TP_1$, $TP_2$, $TP_3$ and $TP_4$, and $BW_1$ to $BW_4$ are respectively bandwidth parameters of the edge servers 1 to 4. According to the flowchart of the load balancing method disclosed by FIG. 2, first, in step S203, the load balancing device 110 receives a download request (REQ Channel A) for the video stream of the channel A from a user device X, and selects a server group corresponding to the video stream of the channel A from the server groups according to the download request. This server group includes the edge servers 1 and 2. In step S205, the load balancing device 110 selects one edge server having the minimum transmission progress value from the edge servers 1 and 2 to provide video data of the video stream of the channel A to the user device X. It is assumed that the edge server 1 currently has the higher bandwidth load, and the transmission progress value $TP_1$ thereof is greater than the transmission progress value $TP_2$ of the edge server 2. Thus, the load balancing device 110 selects the edge server 2 as the provider of video data corresponding to the download request, calculates an increment and accumulates the increment to the transmission progress value $TP_2$ of the edge server 2 (i.e., $TP_2 \leftarrow TP_2 + ChunkSize_A/BW_2$), as shown in step ① of FIG. 5A. The increment may be calculated by dividing the size ($ChunkSize_A$) of video data of the video stream of the channel A by a bandwidth parameter ($BW_2$) of the edge server 2. When receiving a redirection response from the load balancing device 110, the user device X downloads video data corresponding to the download request from the edge server 2,), as shown in step ① of FIG. 5B.

Then, the load balancing device 110 receives a download request (REQ Channel B) for the video stream of the channel B from a user device Y, and selects a server group corresponding to the video stream of the channel B according to the download request. Namely, this server group includes the edge servers 2 and 3. Similarly, the load balancing device 110 selects one of the edge servers having the minimum transmission progress value from the server group corresponding to the video stream of the channel B. In this circumstance, the transmission progress value $TP_2$ of the edge server 2 is increased due to the accumulation in step ①, and thus, the load balancing device 110 selects the edge server 3 as the provider of video data corresponding to the download request, calculates an increment and accumulates the increment to the transmission progress value $TP_3$ of the edge server 3 (i.e., $TP_3 \leftarrow TP_3 + ChunkSize_B/BW_3$), as shown in step ② of FIG. 5A. When receiving a redirection response from the load balancing device 110, the user device Y downloads video data corresponding to the download request from the edge server 3, as shown in step ② illustrated in FIG. 5B.

Then, the load balancing device 110 receives a download request (REQ Channel C) for the video stream of the channel C from a user device Z, and selects a server group corresponding to the video stream of the channel C according to the download request. Namely, this server group includes the edge servers 3 and 4. Similarly, the load balancing device 110 selects the edge server having the minimum transmission progress value from the server group corresponding to the video stream of the channel C. In this circumstance, the transmission progress value $TP_3$ of the edge server 3 is increased due to the accumulation in step ②, thus, the load balancing device 110 selects the edge server 4 as the provider of video data corresponding to the download request, calculates an increment and accumulates the increment to the transmission progress value $TP_4$ of the edge server 4 (i.e., $TP_4 \leftarrow TP_4 + ChunkSize_C/BW_4$), as shown in step ③ of FIG. 5A. When receiving a redirection response from the load balancing device 110, the user device Z downloads video data corresponding to the download request from the edge server 4, as shown in step ③ of FIG. 5B.

It should be noted that according to video data spreading topology of the example illustrated in FIG. 5A and FIG. 5B, the server group corresponding to each channel only covers part of the edge servers, and the bandwidth load of any one of the edge servers (e.g., the edge server 1) may be evenly distributed to all the other edge serves (i.e., the edge servers 2 to 4). In other words, the usage amount of the bandwidth resource may be self-adapted among all the edge servers. Thus, the method may automatically achieve bandwidth load balancing for all the edge servers by utilizing an effect of resource connectivity resulted from overlapping the server group corresponding to each video stream.

Figure 6:
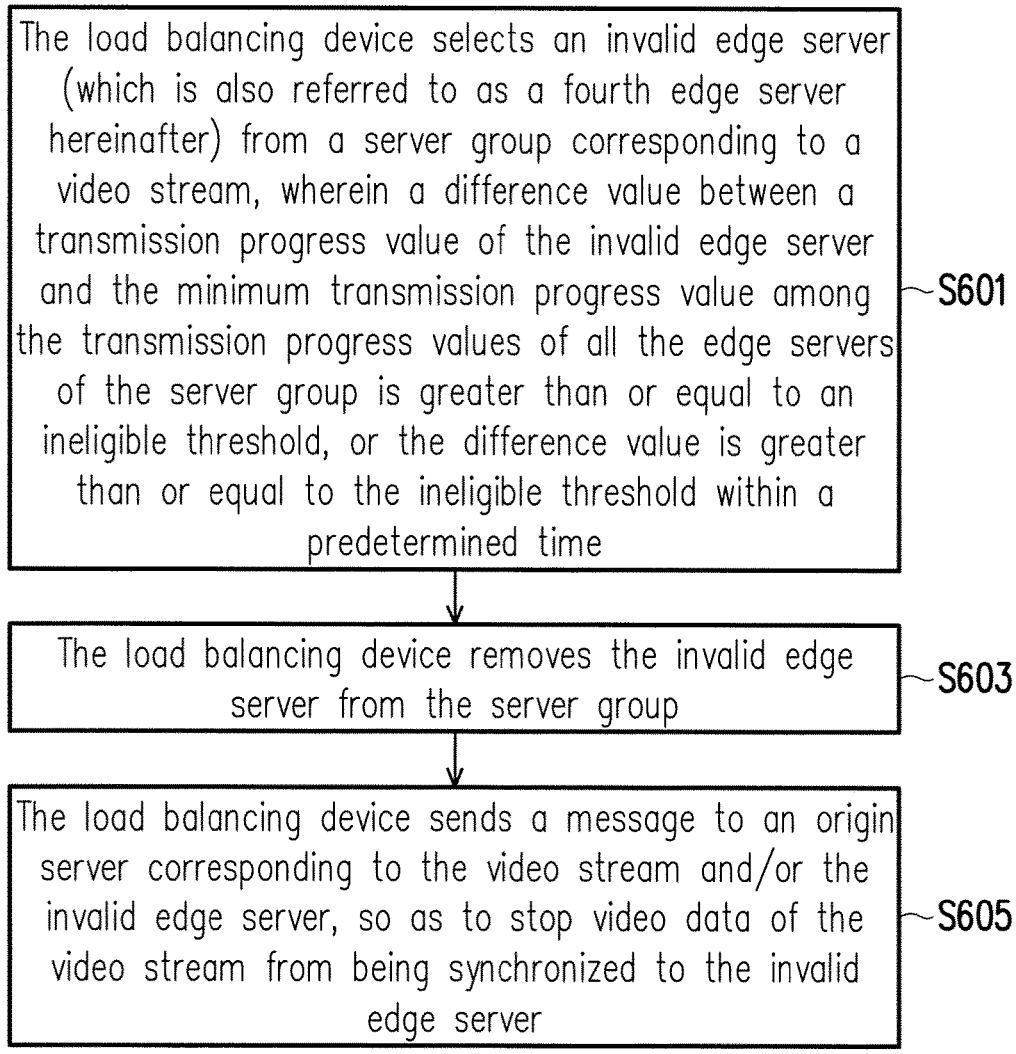
FIG. 6 is a flowchart of a video spreading topology reduction method according to an exemplary embodiment.

FIG. 6 is a flowchart of a video spreading topology reduction method according to an exemplary embodiment.

Referring to FIG. 6, in step S601, the load balancing device 110 selects an invalid edge server (which is also referred to as a fourth edge server hereinafter) from a server group corresponding to a video stream. A difference value between a transmission progress value of the invalid edge server and the minimum transmission progress value among the transmission progress values of all the edge servers of the server group is greater than or equal to an ineligible threshold, or the difference value is greater than or equal to the ineligible threshold within a predetermined time. It should be noted that the ineligible threshold represents an upper offset limit of the bandwidth usage amount of each edge server with respect to the server group. Additionally, the predetermined time may be 10 seconds or 1 minute, for example. In step S603, the load balancing device 110 removes the invalid edge server from the server group, and in step S605, the load balancing device 110 sends a message to an origin server corresponding to the video stream and/or the invalid edge server, so as to stop video data of the video stream from being synchronized to the invalid edge server.

Specifically, since for the server group corresponding to each video stream, only the edge server having the minimum transmission progress value is selected as a node for downloading the video stream data, an edge server with the a too large transmission progress value in the server group is no longer available for serving the video stream in a short time, such that the edge server with the too large transmission progress value may be removed from the server group. Usually, such situation may occur when one edge server is transiently overused by other video streams, and it leads to a greater load of the edge server than others in the server group. A transient offset amount that is tolerable for each transmission progress value may be taken into account during the setting of the ineligible threshold, and calculated according to a maximum transient increment of the number of the channel viewers.

Figure 7:
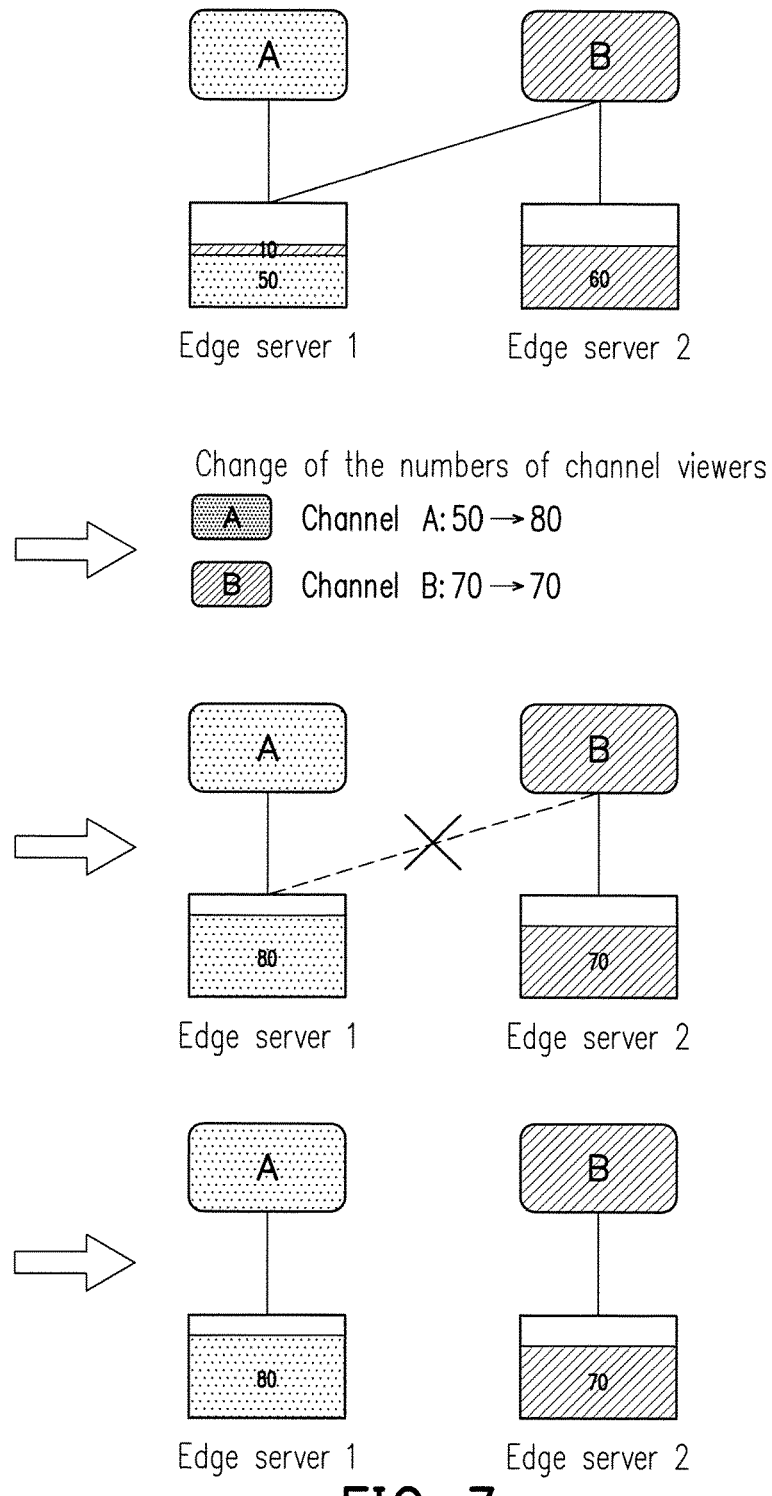
FIG. 7 illustrates an example of the video spreading topology reduction method according to an exemplary embodiment.

FIG. 7 illustrates an example of the video spreading topology reduction method according to an exemplary embodiment.

Referring to FIG. 7, originally, the video stream of the channel A is synchronized to the edge server 1, the video stream of the channel B is synchronized to the edge servers 1 and 2, the numbers of viewers watching the channels A and B are respectively 50 and 70, and the bandwidth usage amounts of the edge servers 1 and 2 reach load balancing. As the number of the viewers watching the channel A is increased to 80, a transmission progress value of the edge server 1 is also rapidly increased along with the increase of the number of the viewers watching the channel A. The load balancing device 110 does not redirect the download request for video data of the video stream of the channel B to the edge server 1 of the server group originally belonging to the video stream of the channel B in a short time. Thus, the edge server 1 substantially no longer provides the load-sharing service for the video stream of the channel B. Thus, the synchronization connection of video data of the video stream of the channel B from the origin server B to the edge server 1 may be stopped.

Figure 8:
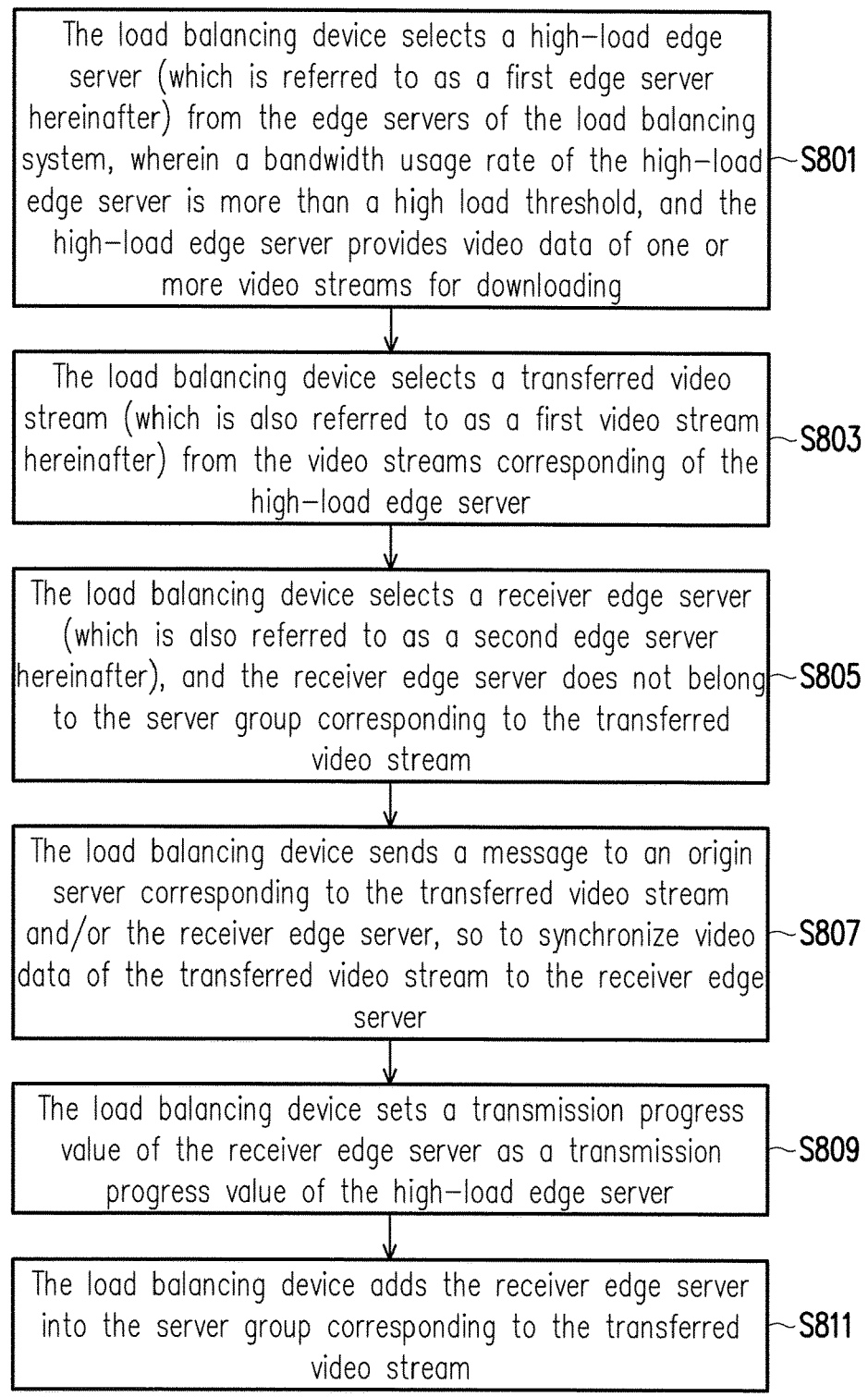
FIG. 8 is a flowchart of a video spreading topology enhancement method according to an exemplary embodiment.

FIG. 8 is a flowchart of a video spreading topology enhancement method according to an exemplary embodiment.

Referring to FIG. 8, in step S801, the load balancing device 110 selects a high-load edge server (which is referred to as a first edge server hereinafter) from the edge servers of the load balancing system 100. A bandwidth usage rate of the high-load edge server is more than a high load threshold, and the high-load edge server provides video data of one or more video streams for downloading. In step S803, the load balancing device 110 selects a transferred video stream (which is also referred to as a first video stream hereinafter) from the video streams corresponding of the high-load edge server. And, in step S805, the load balancing device 110 selects a receiver edge server (which is also referred to as a second edge server hereinafter), and the receiver edge server does not belong to the server group corresponding to the transferred video stream.

For example, in an exemplary embodiment, the load balancing device 110 first selects edge servers whose bandwidth usage rate are not 0 and less than a low load threshold from the edge servers which do not belong to the server group corresponding to the transferred video stream, and then, arbitrarily selects an edge server from the selected edge servers as the receiver edge server, or selects an edge server with the highest bandwidth usage rate from the selected edge servers as the receiver edge server. Additionally, if there is no edge server whose bandwidth usage rate is not 0 and less than the low load threshold among the edge servers which do not belong to the server group corresponding to the transferred video stream, the load balancing device 110 first selects edge servers whose bandwidth usage rate are between the low load threshold and the high load threshold from the edge servers which do not belong to the server group corresponding to the transferred video stream, and then, selects an edge server with the lowest bandwidth usage rate from the selected edge servers as the receiver edge server.

Then, in step S807, the load balancing device 110 sends a message to an origin server corresponding to the transferred video stream and/or the receiver edge server, so to synchronize video data of the transferred video stream to the receiver edge server. Thereafter, in step S809, the load balancing device 110 sets a transmission progress value of the receiver edge server as a transmission progress value of the high-load edge server. In step S811, the load balancing device 110 adds the receiver edge server into the server group corresponding to the transferred video stream. In the present exemplary embodiment, for example, the high load threshold is set to 80% of the outbound bandwidth of each edge server, and the low load threshold is set to 60% of the outbound bandwidth of each edge server.

In the present exemplary embodiment, by preferentially selecting the edge server with the highest bandwidth usage rate from the edge servers whose bandwidth usage rates are lower the low load threshold as the receiver edge server, the amount of the edge servers used by the load balancing system 110 may be reduced, and the usage rate of each edge server in use may be increased. By selecting the edge server with the lowest bandwidth usage rate from the edge servers whose bandwidth usage rates are between the low load threshold and the high load threshold as the receiver edge server, the bandwidth usage rate of each individual edge server may be prevented from exceeding the high load threshold as much as possible in the condition that the overall usage rate of the edge servers of the load balancing system 100 is high. Additionally, in order to ensure that the server group corresponding to the transferred video stream may maintain a correct load balancing effect after the receiver edge server is added, a uniformizing setting operation has to be performed on the transmission progress value of the receiver edge server in advance. For example, in step S809, when performing the uniformizing setting operation, the load balancing device 110 sets the transmission progress value of the receiver edge server as the transmission progress value of the high-load edge server.

Figure 9:
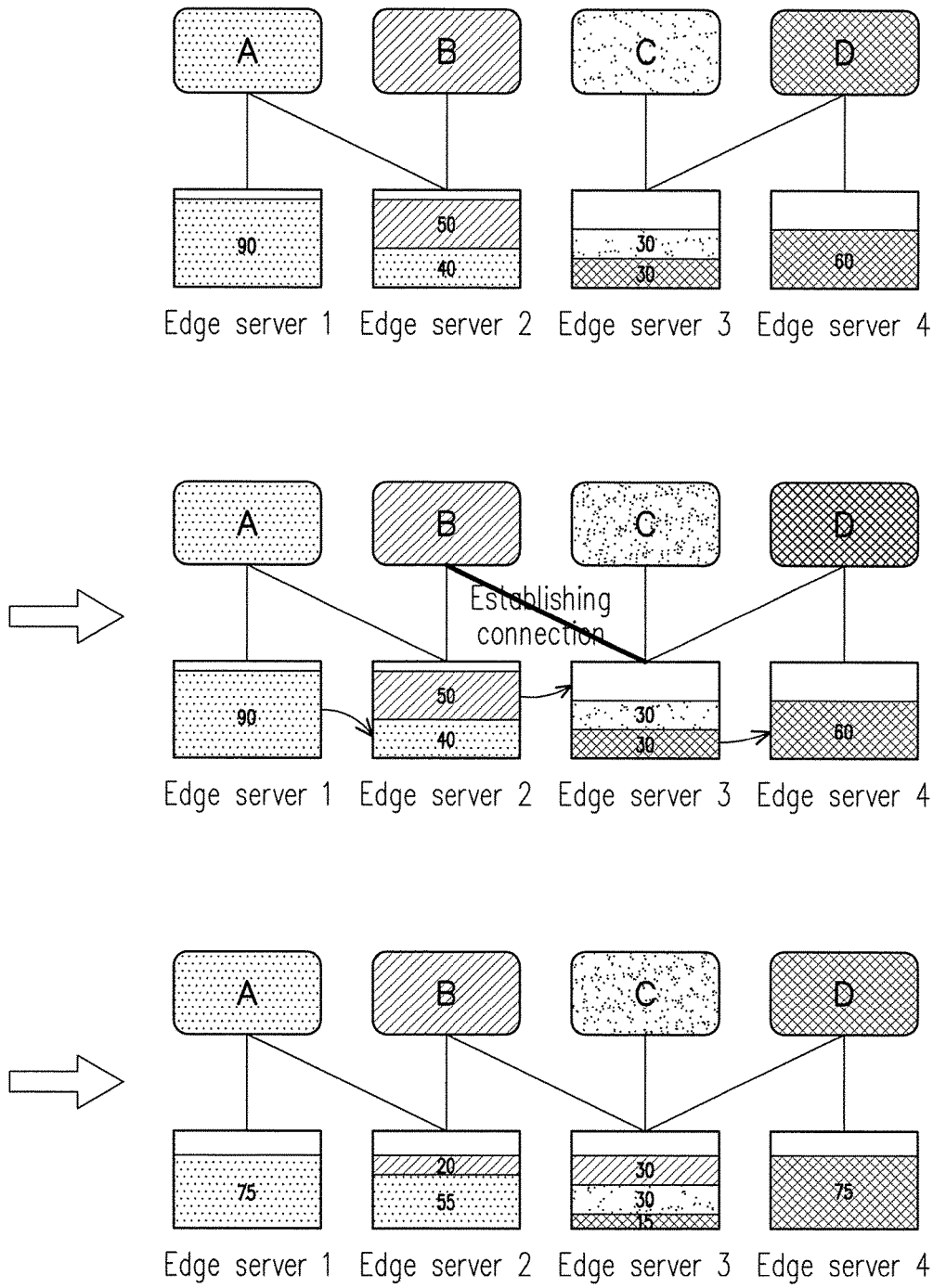
FIG. 9 illustrates an example of the video spreading topology enhancement method according to an exemplary embodiment.

FIG. 9 illustrates an example of the video spreading topology enhancement method according to an exemplary embodiment.

Referring to FIG. 9, due to an over high bandwidth load appearing in the edge server 2, the load balancing device 110 selects the transferred video stream corresponding to the channel B and transfers the load thereof from the edge server 2 to the receiver edge server (i.e., the edge server 3). According to the video spreading topology enhancement method according to the present exemplary embodiment, the edge server 3 not only shares the load of the video stream of channel B from the edge server 2, but also achieves an effect of the edge servers 3 and 4 commonly sharing bandwidth loads of the edge servers 1 and 2 through the load connectivity between the server groups respectively corresponding to the video streams of the channels A and D.

Referring to again FIG. 8, if in step S805, the load balancing device 110 finds neither any edge server whose bandwidth usage rate is not 0 and lower than the low load threshold, nor any edge server whose bandwidth usage rate is between the low load threshold and the high load threshold, the load balancing device 110 selects an edge server whose bandwidth usage rate is 0 as the receiver edge server. The method of selecting the edge server whose bandwidth usage rate is 0 as the receiver edge server described above is also referred to as a dynamic server scaling method.

Figure 10:
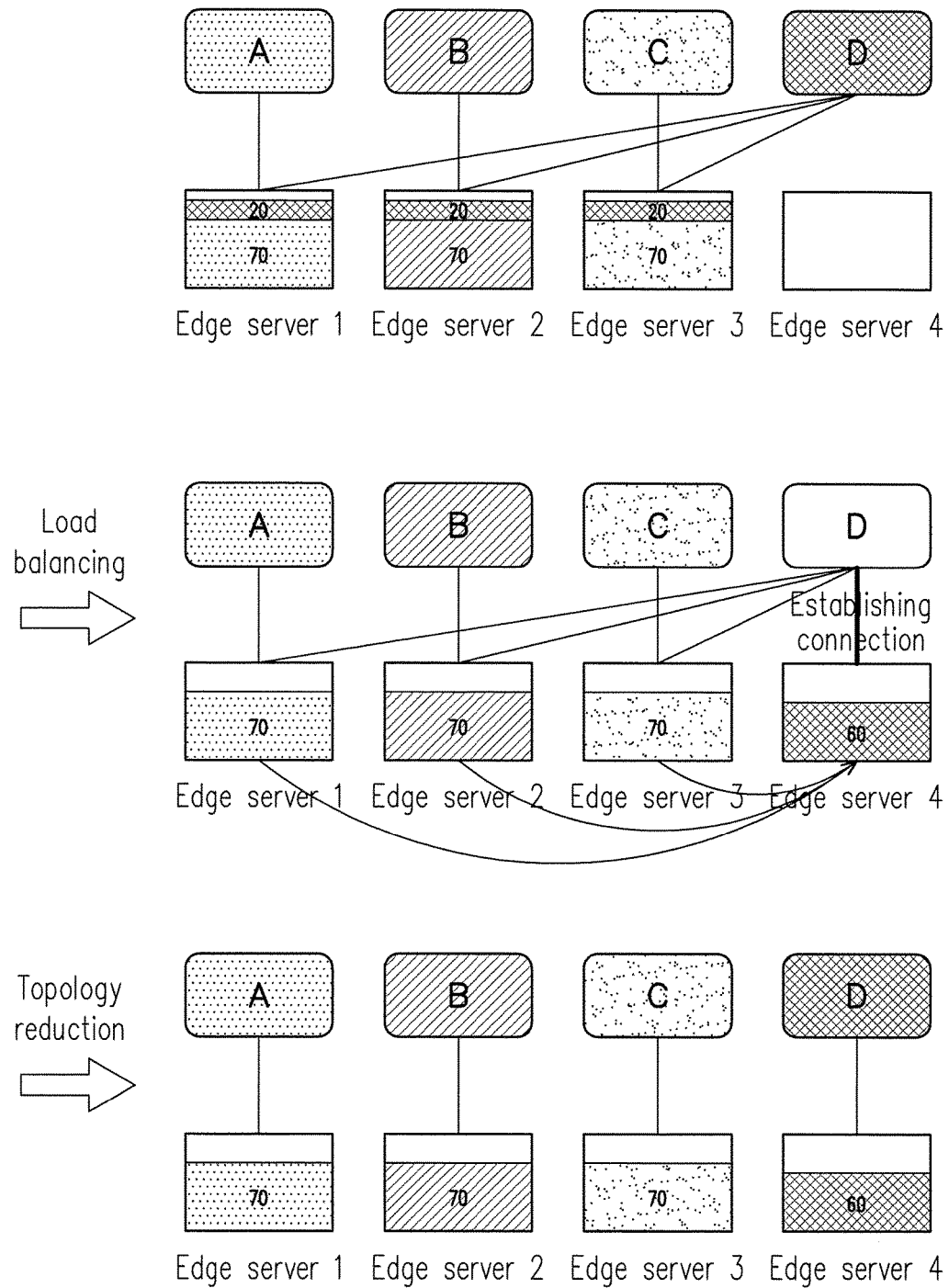
FIG. 10 illustrates an example of a dynamic server scaling method according to an exemplary embodiment.

FIG. 10 illustrates an example of a dynamic server scaling method according to an exemplary embodiment.

Referring to FIG. 10, the load balancing device 110 detects that the edge server 3 is a high-load server, and thus, selects a transferred video stream from the channels served by the edge server 3. For descriptive convenience, it is assumed that the channel D is selected to provide the transferred video stream. After the transferred video stream is selected, in the dynamic server scaling method of the present exemplary embodiment, a synchronization connection from the origin server D to the dynamically scaled edge server 4 is established, and with the use of the load balancing method described above, the edge server 4 automatically shares the bandwidth loads of the video streams of the channel D from the edge servers 1, 2 and 3 to re-converge to a preferable load balancing state. Additionally, with the use of the video spreading topology reduction method described above, the load balancing device 110 also automatically removes synchronization connections from the origin server D (i.e., channel D) to the edge servers 1, 2 and 3.

Figure 11:
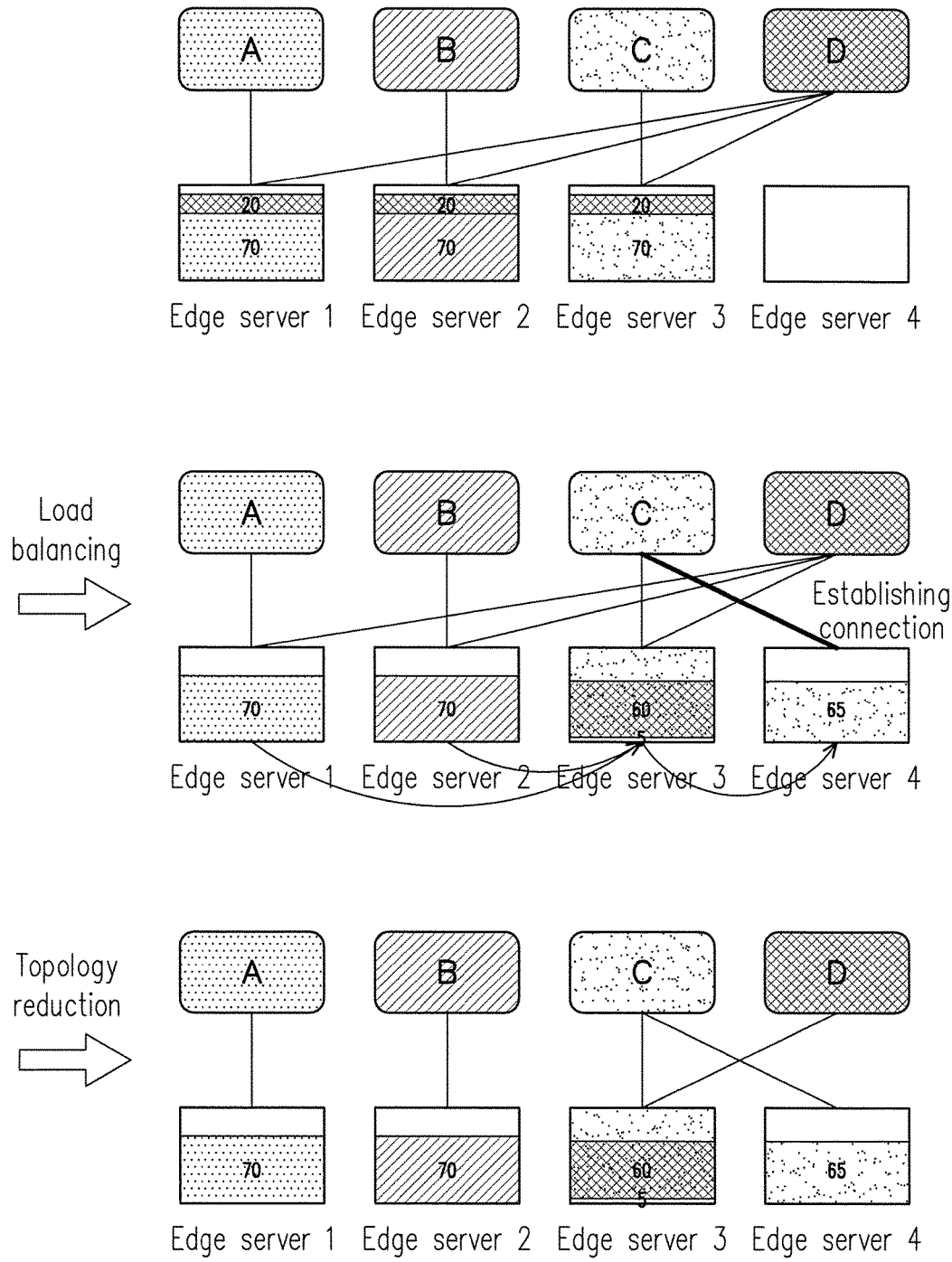
FIG. 11 illustrates another example of the dynamic server scaling method according to an exemplary embodiment.

FIG. 11 illustrates another example of a dynamic server scaling method according to an exemplary embodiment.

Referring to FIG. 11, if it is assumed that the channel C corresponding to the edge server 3 is selected to provide the transferred video stream, the load balancing device 110 establishes a synchronization connection from the origin server C to the dynamically scaled edge server 4. With the use of the load balancing method described above, the edge server 4 automatically shares the bandwidth load of the video stream of channel C at the edge server 3, and the edge server 3 automatically shares the bandwidth loads of the video stream of the channel D at the edge servers 1 and 2 to a preferable load balancing state. Additionally, with the use of the video spreading topology reduction method described above, the load balancing device 110 also automatically removes synchronization connections from the channel D to the edge servers 1 and 2.

Figure 12A:
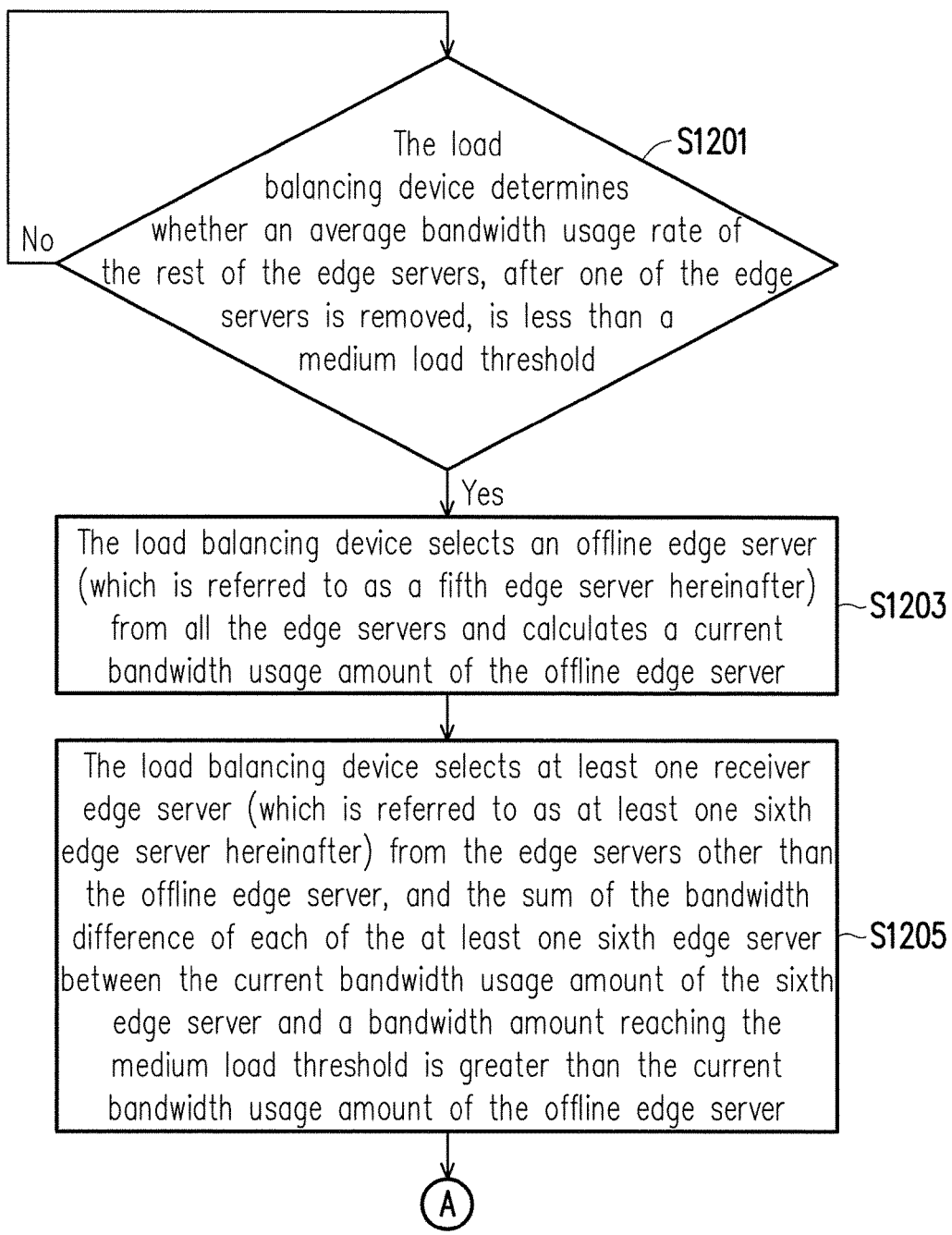
FIG. 12A and FIG. 12B are flowcharts of a dynamic server reduction method according to an exemplary embodiment.
Figure 12B:
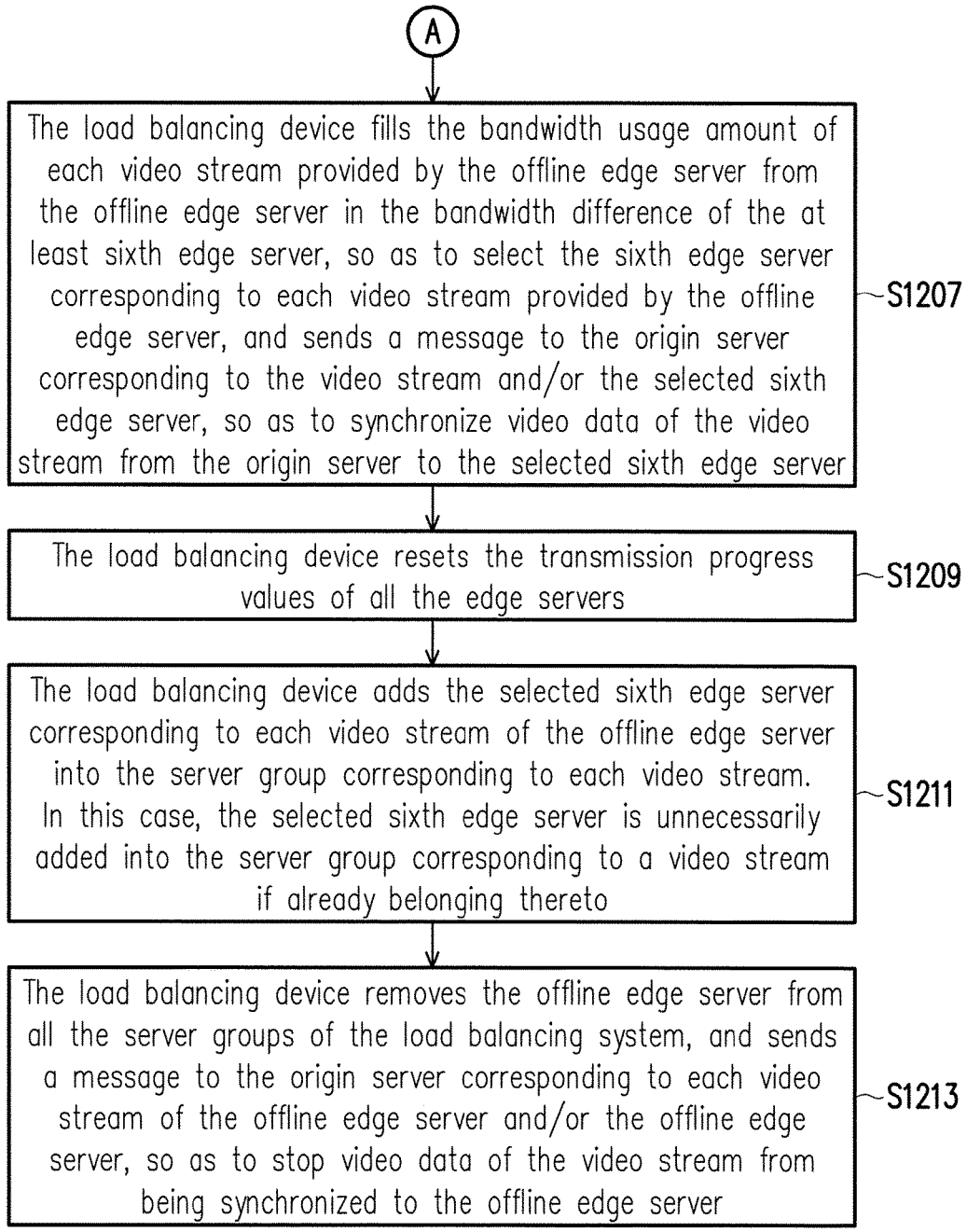

FIG. 12A and FIG. 12B are flowcharts of a dynamic server reduction method according to an exemplary embodiment.

Referring to FIG. 12A and FIG. 12B, in step S1201, the load balancing device 110 determines whether an average bandwidth usage rate of the rest of the edge servers, after one of the edge servers is removed, is less than a medium load threshold. If the average bandwidth usage rate of the rest of the edge servers, after one of the edge servers is removed, is still less than the medium load threshold, in step S1203, the load balancing device 110 selects an offline edge server (which is referred to as a fifth edge server hereinafter) from all the edge servers and calculates a current bandwidth usage amount of the offline edge server. In step S1205, the load balancing device 110 selects at least one receiver edge server (which is referred to as at least one sixth edge server hereinafter) from the edge servers other than the offline edge server, and the sum of the bandwidth difference of each of the at least one sixth edge server between the current bandwidth usage amount of the sixth edge server and a bandwidth amount reaching the medium load threshold is greater than the current bandwidth usage amount of the offline edge server. In step S1207, the load balancing device 110 fills the bandwidth usage amount of each video stream provided by the offline edge server from the offline edge server in the bandwidth difference of the at least sixth edge server, so as to select the sixth edge server corresponding to each video stream provided by the offline edge server, and sends a message to the origin server corresponding to the video stream and/or the selected sixth edge server, so as to synchronize video data of the video stream from the origin server to the selected sixth edge server. In this case, if video data synchronization is performed on the origin server corresponding to the video stream and the selected sixth edge server, the message is unnecessarily sent again, namely, the video data is unnecessarily synchronized repeatedly. In step S1209, the load balancing device 110 resets the transmission progress values of all the edge servers, for example, the load balancing device 110 resets the transmission progress values of all the edge servers to 0. In step S1211, the load balancing device 110 adds the selected sixth edge server corresponding to each video stream of the offline edge server into the server group corresponding to each video stream. In this case, the selected sixth edge server is unnecessarily added into the server group corresponding to a video stream if already belonging thereto. In step S1213, the load balancing device 110 removes the offline edge server from all the server groups of the load balancing system 100, and sends a message to the origin server corresponding to each video stream of the offline edge server and/or the offline edge server, so as to stop video data of the video stream from being synchronized to the offline edge server. Lastly, the offline edge server is turned off. In the present exemplary embodiment, the medium load threshold is set to 70% of the total bandwidth of each edge server, for example.

Figure 13A:
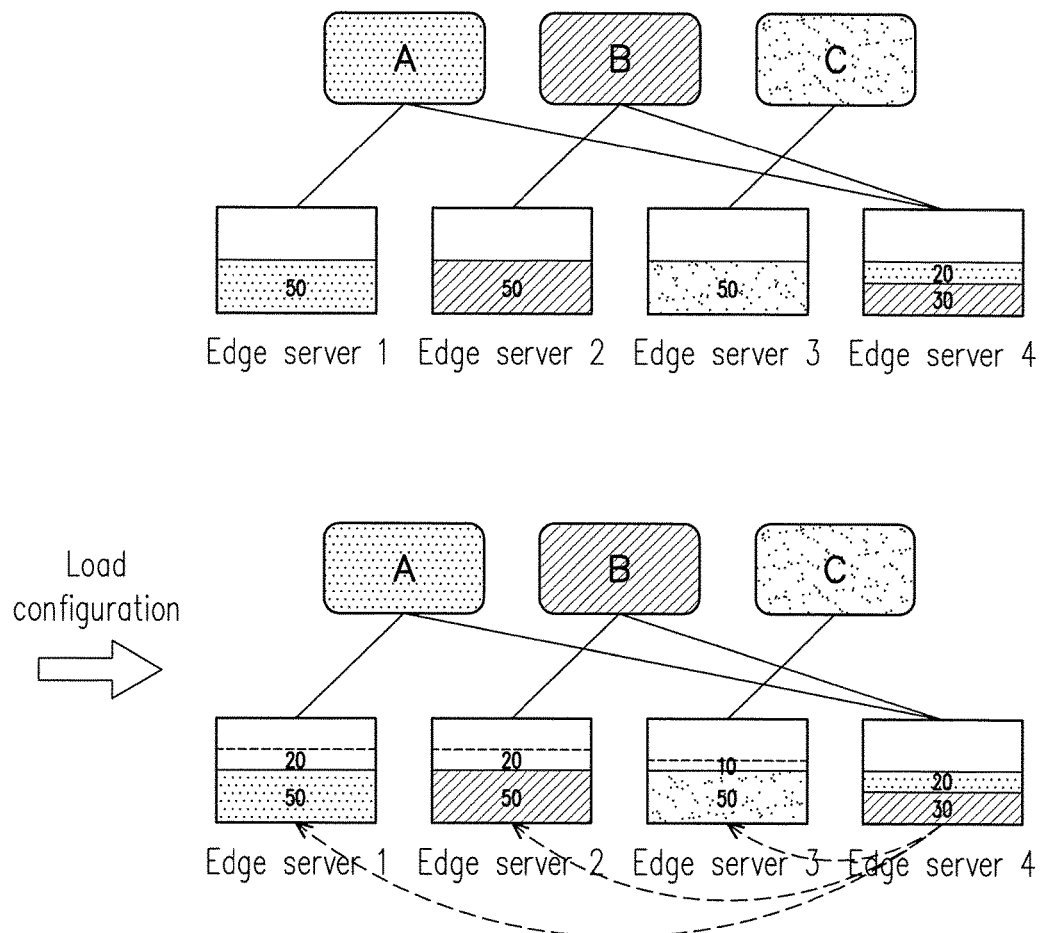
FIG. 13A and FIG. 13B illustrate an example of the dynamic server reduction method according to an exemplary embodiment.
Figure 13B:
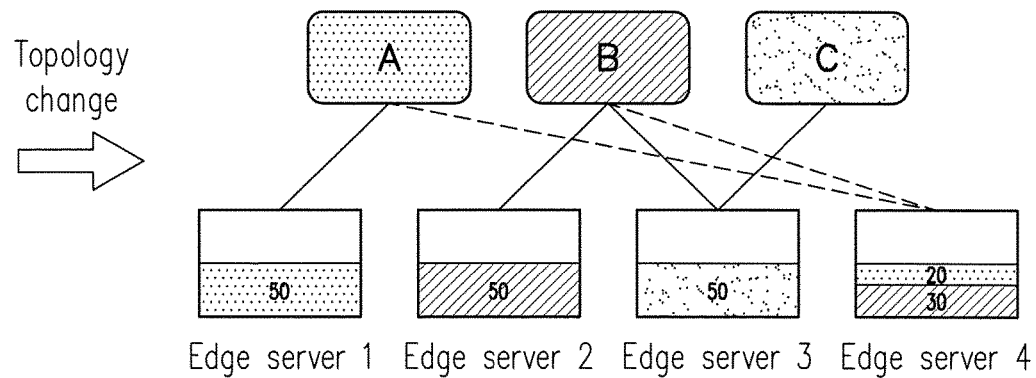
Figure 13B:
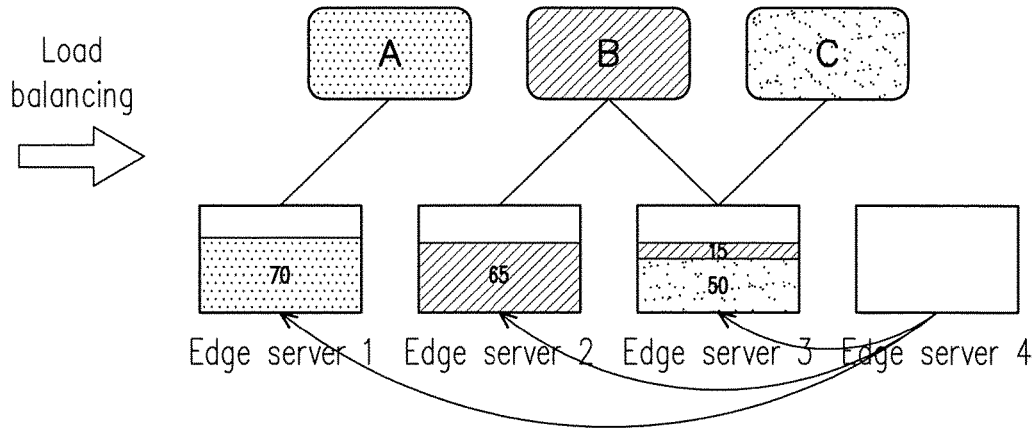

FIG. 13A and FIG. 13B are flowcharts of a dynamic server reduction method according to an exemplary embodiment.

Referring to FIG. 13A and FIG. 13B, the load balancing device 110 selects the edge server 4 as the offline edge server, and fills the bandwidth usage amount of the video stream of each channel served by the edge server 4 in a bandwidth difference of other edge servers. The bandwidth usage amount of the video stream of the channel A at the edge server 4 is filled in the edge server 1, and the bandwidth usage amount of the video stream of the channel B at the edge server 4 is divided and then respectively filled in the edge servers 2 and 3. Since the bandwidth usage amount of the edge server 4 corresponding to the video stream of the channel B is distributed to the edge servers 2 and 3, and video data synchronization is not yet performed on the origin server B and the edge server 3, video data synchronization between the origin server B and the edge server 3 has to be first established (corresponding to step S1207 illustrated in FIG. 12B), and then, the edge server 3 is added into the server group corresponding to the video stream of the channel B (corresponding to step S1211 illustrated in FIG. 12B). Lastly, the load balancing system 100 is re-converged to a preferable load balancing state, and the edge server 4 may be closed after all the bandwidth loads are transferred.

The aforementioned relation that each video channel corresponds to an origin server, and the origin server generates a video stream corresponding to each video channel is set forth only for descriptive convenience. Actually, each origin server may be simultaneously coupled to and serve a plurality of video channels, and the each of the origin servers may generate at least one of a plurality of video streams corresponding to a variety of resolutions for each video channel. For the edge servers, a plurality of video streams corresponding to the same video channel are considered as different video streams. Thus, it is more accurate to say that the object which each edge server provides the load-sharing service to is an individual video stream. Namely, video data of a plurality of video streams corresponding to the same video channel may be synchronized to different edge servers.

Based on the above, the load balancing system, the load balancing device, and the topology management method introduced by the disclosure can be used to automatically adjust the bandwidth distribution ratio of all the servers in the system for downloading the data of each video stream, and adaptively reduce or enhance the topology between the origin servers and the edge servers, so as to save the upload bandwidths of the origin servers and achieve load balancing among a plurality of server groups. Additionally, the load balancing system, the load balancing device, and the topology management method introduced by the disclosure can also be used to perform the scaling of the edge servers corresponding to the video streams of the origin servers to mitigate the overloaded situation occurring to the edge servers. The load balancing system, the load balancing device, and the topology management method introduced by the disclosure can also be used to perform the reduction of the edge servers corresponding to the video streams of the origin servers, so as to provide sufficient bandwidths for downloading the video stream data by using the least number of edge servers in the condition that the load of each edge server does not exceed the high load.

Although the invention has been disclosed by the above embodiments, they are not intended to limit the invention. It will be apparent to one of ordinary skill in the art that modifications and variations to the invention may be made without departing from the spirit and scope of the invention. Therefore, the scope of the invention will be defined by the appended claims.

What is claimed is:

1. A topology management method, comprising:
configuring and maintaining a transmission progress value for each of a plurality of edge servers, and grouping the plurality of edge servers into a plurality of server groups, wherein the edge servers of each of the plurality of server groups provide at least one of a plurality of video streams, and each of the plurality of edge servers is grouped into at least one server group among the plurality of server groups;
selecting a first edge server from the plurality of edge servers, wherein a bandwidth usage rate of the first edge server is more than a high load threshold, and the first edge server provides video data of at least one video stream of the plurality of video streams;
selecting a first video stream from the at least one video stream corresponding of the first edge server;
selecting a second edge server from the plurality of edge servers;
synchronizing video data of the first video stream to the second edge server;
setting a transmission progress value of the second edge server as a transmission progress value of the first edge server; and
adding the second edge server into a server group corresponding to the first video stream.

2. The topology management method according to claim 1, wherein the step of configuring and maintaining the transmission progress value for each of the plurality of edge servers comprises:
receiving a download request corresponding to a second video stream among the plurality of video streams from a user device;
selecting a first server group from the plurality of the server groups according to the download request, wherein the first server group provides the second video stream; and
selecting one edge server from the edge servers of the first server group as a third edge server to provide video data of the second video stream to the user device according to the transmission progress values of the edge servers of the first server group.

3. The topology management method according to claim 2, wherein the step of selecting the one edge server from the edge servers of the first server group as the third edge server to provide the video data of the second video stream to the user device according to the transmission progress values of the edge servers of the first server group comprises:
selecting the one edge server of the first server group having a minimum transmission progress value as the third edge server;
calculating an increment and accumulating the increment to a transmission progress value of the third edge server; and
redirecting the download request to the third edge server.

4. The topology management method according to claim 3, wherein the increment is calculated by dividing a size of the video data by a first bandwidth parameter of the third edge server, wherein the first bandwidth parameter is determined according to an outbound bandwidth of the third edge server.

5. The topology management method according to claim 1, wherein the step of selecting the second edge server comprising:
selecting an edge server whose bandwidth usage rate is not 0 and less than a low load threshold from the plurality of edge servers which do not belong to the server group corresponding to the first video stream as a second edge server.

6. The topology management method according to claim 5, wherein the step of selecting the second edge server further comprises:
if there is no edge server whose bandwidth usage rate is not 0 and less than the low load threshold from the plurality of edge servers which do not belong to the server group corresponding to the first video stream, and selecting an edge server whose bandwidth usage rate is between the low load threshold and the high load threshold from the plurality of edge servers which do not belong to the server group corresponding to the first video stream as the second edge server.

7. The topology management method according to claim 6, wherein the step of electing the second edge server further comprises:
if there is no edge server whose bandwidth usage rate is between the low load threshold and the high load threshold from the plurality of edge servers which do not belong to the server group corresponding to the first video stream, and selecting an edge server whose bandwidth usage rate is 0 as the second edge server.

8. The topology management method according to claim 1, further comprises:
selecting a fourth edge server from a server group corresponding to a third video stream, wherein a difference value between a transmission progress value of the fourth edge server and a minimum transmission progress value among the transmission progress values of all the edge servers of the server group corresponding to the third video stream is greater than or equal to an ineligible threshold, or wherein the difference value is greater than or equal to the ineligible thrshold within a predetermined time;
removing the fourth edge server from the server group corresponding to the third video stream; and
sending a message to an origin server corresponding to the third video stream or the fourth edge server to stop video data of the third video stream from being synchronized to the fourth edge server.

9. A load balancing system, comprising:
a plurality of edge servers;
a plurality of origin servers coupled to the plurality of edge servers, wherein each of the plurality of origin servers generates at least one of a plurality of video streams, video data of the plurality of video stream is synchronized to at least one of the plurality of edge servers; and
a load balancing device coupled to the plurality of origin servers and the plurality of edge servers,
wherein the load balancing device configures and maintains a transmission progress value for each of the plurality of edge servers,
wherein the load balancing device groups the plurality of edge servers into a plurality of server groups, wherein the edge servers of each of the plurality of server groups provide one of the plurality of video stream, and each of the plurality of edge servers is grouped into at least one server group among the plurality of server groups,
wherein the load balancing device selects a first edge server from the plurality of edge servers, wherein a bandwidth usage rate of the first edge server is more than a high load threshold, and the first edge server provides video data of at least one video stream of the plurality of video streams,
wherein the load balancing device selects a first video stream from the at least one video stream corresponding of the first edge server,
wherein the load balancing device selects a second edge server from the plurality of edge servers,
wherein the load balancing device synchronizes video data of the first video stream to the second edge server,
wherein the load balancing device sets a transmission progress value of the second edge server as a transmission progress value of the first edge server,
wherein the load balancing device adds the second edge server into a server group corresponding to the first video stream.

10. The load balancing system according to claim 9, wherein the load balancing device receives a download request corresponding to a second video stream among the plurality of video streams from a user device, wherein a first server group from the plurality of the server groups provides the second video stream,
wherein the load balancing device selects one edge server from the edge servers of the first server group as a third edge server to provide video data of the second video stream to the user device according to the transmission progress values of the edge servers of the first server group.

11. The load balancing system according to claim 10, wherein the load balancing device selects the one edge server of the first server group having a minimum transmission progress value as the third edge server,
wherein the load balancing device calculates an increment and accumulating the increment to a transmission progress value of the third edge server,
wherein the load balancing device redirects the download request to the third edge server.

12. The load balancing system according to claim 11, wherein the increment is calculated by dividing a size of the video data by a first bandwidth parameter of the third edge server, wherein the first bandwidth parameter is determined according to an outbound bandwidth of the third edge server.

13. The load balancing system according to claim 9, wherein the load balancing device selects an edge server whose bandwidth usage rate is not 0 and less than a low load threshold from the plurality of edge servers which do not belong to the server group corresponding to the first video stream as a second edge server.

14. The load balancing system according to claim 13, wherein if there is no edge server whose bandwidth usage rate is not 0 and less than the low load threshold from the plurality of edge servers which do not belong to the server group corresponding to the first video stream, and the load balancing device selects an edge server whose bandwidth usage rate is between the low load threshold and the high load threshold from the plurality of edge servers which do not belong to the server group corresponding to the first video stream as the second edge server.

15. The load balancing system according to claim 14, wherein if there is no edge server whose bandwidth usage rate is between the low load threshold and the high load threshold from the plurality of edge servers which do not belong to the server group corresponding to the first video stream, and the load balancing device selects an edge server whose bandwidth usage rate is 0 as the second edge server.

16. The load balancing system according to claim 9, further comprises:

wherein the load balancing device selects a fourth edge server from a server group corresponding to a third video stream, wherein a difference value between a transmission progress value of the fourth edge server and a minimum transmission progress value among the transmission progress values of all the edge servers of the server group corresponding to the third video stream is greater than or equal to an ineligible threshold, or wherein the difference value is greater than or equal to the ineligible threshold within a predetermined tune, wherein the load balancing device removes the fourth edge server from the server group corresponding to the third video stream, wherein the load balancing device sends a message to the origin server corresponding to the third video stream or the fourth edge server to stop video data of the third video stream from being synchronized to the fourth edge server.

17. A load balancing device, comprising a processing unit and a communication unit, wherein the load balancing device is coupled to a plurality of origin servers and a plurality of edge servers through the communication unit, the plurality of origin servers are coupled to the plurality of edge servers, each of the plurality of origin servers generates at least one of a plurality of video streams, and video data of the plurality of video stream is synchronized to at least one of the plurality of edge servers, wherein the processing unit configures and maintains a transmission progress value for each of the plurality of edge servers, wherein the processing unit groups the plurality of edge servers into a plurality of server groups, wherein the edge servers of each of the plurality of server groups provide one of the plurality of video stream, and each of the plurality of edge servers is grouped into at least one server group among the plurality of server groups, wherein the processing unit selects a first edge server from the plurality of edge servers, wherein a bandwidth usage rate of the first edge server is more than a high load threshold, and the first edge server provides video data of at least one video stream of the plurality of video streams, wherein the processing unit selects a first video stream from the at least one video stream corresponding of the first edge server, wherein the processing unit selects a second edge server from the plurality of edge servers, wherein the communication unit sends a message to the origin server corresponding to the first video stream or the second edge server, and synchronizes video data of the first video stream to the second edge server, wherein the processing unit sets a transmission progress value of the second edge server as a transmission progress value of the first edge server, wherein the processing unit adds the second edge server into the server group corresponding to the first video stream.

18. The load balancing device according to claim 17, wherein the processing unit receives a download request corresponding to a second video stream among the plurality of video streams from a user device, wherein a first server group from the plurality of the server groups provides the second video stream, wherein the processing unit selects one edge server from the edge servers of the first server group as a third edge server to provide video data of the second video stream to the user device according to the transmission progress values of the edge servers of the first server group.

19. The load balancing device according to claim 18, wherein the processing unit selects the one edge server of the first server group having a minimum transmission progress value as the third edge server, wherein the processing unit calculates an increment and accumulating the increment to a transmission progress value of the third edge server, wherein the processing unit redirects the download request to the third edge server.

20. The load balancing device according to claim 19, wherein the increment is calculated by dividing a size of the video data by a first bandwidth parameter of the third edge server, wherein the first bandwidth parameter is determined according to an outbound bandwidth of the third edge server.

21. The load balancing device according to claim 17, the processing unit selects an edge server whose bandwidth usage rate is not 0 and less than a low load threshold from the plurality of edge servers which do not belong to the server group corresponding to the first video stream as a second edge server.

22. The load balancing device according to claim 21, wherein if there is no edge server whose bandwidth usage rate is not 0 and less than the low load threshold from the plurality of edge servers which do not belong to the server group corresponding to the first video stream, and the processing unit selects an edge server whose bandwidth usage rate is between the low load threshold and the high load threshold from the plurality of edge servers which do not belong to the server group corresponding to the first video stream as the second edge server.

23. The load balancing device according to claim 22, wherein if there is no edge server whose bandwidth usage rate is between the low load threshold and the high load threshold from the plurality of edge servers which do not belong to the edge servers of the server group corresponding to the first video stream, and the processing unit selects an edge server whose bandwidth usage rate is 0 as the second edge server.

24. The load balancing device according to claim 17, wherein the processing unit selects a fourth edge server from a server group corresponding to a third video stream, wherein a difference value between a transmission progress value of the fourth edge server and a minimum transmission progress value among the transmission progress values of all the edge servers of the server group corresponding to the third video stream is greater than or equal to an ineligible threshold, or wherein the difference value is greater than or equal to the ineligible threshold within a predetermined time, wherein the processing unit removes the fourth edge server from the server group corresponding to the third video stream, wherein the processing unit sends a message to the origin server corresponding to the third video stream or the fourth edge server to stop video data of the third video stream from being synchronized to the fourth edge server.

* * * * *